US010012778B2

(12) United States Patent
Nick et al.

(10) Patent No.: US 10,012,778 B2
(45) Date of Patent: Jul. 3, 2018

(54) STRESS-RESISTANT COMPONENT FOR USE WITH QUANTUM DOTS

(71) Applicant: SAMSUNG ELECTRONICS CO., LTD., Suwon-si, Gyeonggi-do (KR)

(72) Inventors: Robert J. Nick, Pepperell, MA (US); Sridhar Sadasivan, Somerville, MA (US); John R. Linton, Concord, MA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/862,085

(22) Filed: Jan. 4, 2018

(65) Prior Publication Data
US 2018/0128955 A1    May 10, 2018

Related U.S. Application Data

(63) Continuation of application No. 13/682,563, filed on Nov. 20, 2012, now Pat. No. 9,864,121.

(60) Provisional application No. 61/562,468, filed on Nov. 22, 2011.

(51) Int. Cl.
*G02B 6/00*    (2006.01)
*F21V 8/00*    (2006.01)

(52) U.S. Cl.
CPC ......... *G02B 6/0001* (2013.01); *G02B 6/0023* (2013.01); *Y10T 428/131* (2015.01)

(58) Field of Classification Search
CPC .... G02B 6/003; G02B 6/0096; G02B 6/0001; G02B 6/0023; G02B 6/0031; F21K 9/61; F21K 9/64; F21K 9/56; Y10T 428/131; B82Y 20/00

USPC ......................................... 362/600–634, 293
See application file for complete search history.

(56) References Cited

U.S. PATENT DOCUMENTS

| | | | |
|---|---|---|---|
| 2,028,241 | A | 1/1936 | Paul |
| 5,881,200 | A | 3/1999 | Burt |
| 6,322,901 | B1 | 11/2001 | Bawendi et al. |
| 6,464,898 | B1 | 10/2002 | Tomoike et al. |
| 6,501,091 | B1 | 12/2002 | Bawendi et al. |
| 6,533,445 | B1 | 3/2003 | Rogers |
| 6,600,175 | B1 | 7/2003 | Baretz et al. |
| 6,608,332 | B2 | 8/2003 | Shimizu et al. |
| 6,637,905 | B1 | 10/2003 | Ng et al. |
| 6,641,755 | B2 | 11/2003 | Tomoike et al. |
| 6,744,960 | B2 | 6/2004 | Pelka |
| 6,803,719 | B1 | 10/2004 | Miller et al. |

(Continued)

FOREIGN PATENT DOCUMENTS

| | | |
|---|---|---|
| CN | 101034232 A | 9/2007 |
| CN | 101666952 A | 3/2010 |

(Continued)

OTHER PUBLICATIONS

Anseokhyeon reporter, "LG Innotek, the world's first commercially available quantum dots BLU", ahngija@etnews.co.kr, issued on May 27, 2010. (Korean).

(Continued)

*Primary Examiner* — Sean Gramling
*Assistant Examiner* — Gerald J Sufleta, II
(74) *Attorney, Agent, or Firm* — Cantor Colburn LLP

(57) ABSTRACT

A glass tube including quantum dots in a polymerized matrix is described. An optical component and other products including such glass tube, a composition including quantum dots, and methods are also disclosed.

11 Claims, 5 Drawing Sheets

(56) References Cited

U.S. PATENT DOCUMENTS

| | | |
|---|---|---|
| 7,054,513 B2 | 5/2006 | Herz et al. |
| 7,071,616 B2 | 7/2006 | Shimizu et al. |
| 7,108,416 B1 | 9/2006 | Osawa |
| 7,196,354 B1 | 3/2007 | Erchak et al. |
| 7,318,651 B2 | 1/2008 | Chua et al. |
| 7,374,807 B2 | 5/2008 | Parce et al. |
| 7,481,562 B2 | 1/2009 | Chua et al. |
| 7,544,323 B1 | 6/2009 | Von Krosigk et al. |
| 7,686,493 B2 | 3/2010 | Roshan et al. |
| 7,692,373 B2 | 4/2010 | Bawendi et al. |
| 7,719,016 B2 | 5/2010 | Nada et al. |
| 7,803,423 B2 | 9/2010 | O'Brien et al. |
| 7,867,557 B2 | 1/2011 | Pickett et al. |
| 8,062,703 B2 | 11/2011 | O'Brien et al. |
| 8,097,297 B2 | 1/2012 | Yoon |
| 8,294,168 B2 | 10/2012 | Park et al. |
| 8,427,855 B2 | 4/2013 | Jang et al. |
| 8,684,559 B2 | 4/2014 | Van De Ven et al. |
| 8,773,618 B2 | 7/2014 | Seo et al. |
| 8,786,803 B2 | 7/2014 | Kim et al. |
| 9,110,203 B2 | 8/2015 | Seo et al. |
| 2004/0145289 A1 | 7/2004 | Ouderkirk et al. |
| 2004/0174715 A1 | 9/2004 | Page et al. |
| 2005/0012076 A1 | 1/2005 | Morioka |
| 2005/0051777 A1 | 3/2005 | Hill |
| 2005/0111805 A1 | 5/2005 | Hertz et al. |
| 2005/0261400 A1 | 11/2005 | Yang et al. |
| 2006/0063289 A1 | 3/2006 | Negley et al. |
| 2006/0081862 A1 | 4/2006 | Chua et al. |
| 2006/0103589 A1 | 5/2006 | Chua et al. |
| 2006/0160162 A1 | 7/2006 | Fulwyler et al. |
| 2006/0214903 A1 | 9/2006 | Kurosaka |
| 2006/0255713 A1 | 11/2006 | Kondo et al. |
| 2006/0261325 A1 | 11/2006 | Zanrosso et al. |
| 2007/0012928 A1 | 1/2007 | Peng et al. |
| 2007/0164661 A1 | 7/2007 | Kuma |
| 2008/0020235 A1 | 1/2008 | Parce et al. |
| 2008/0173886 A1 | 7/2008 | Cheon et al. |
| 2008/0220593 A1 | 9/2008 | Pickett et al. |
| 2008/0237540 A1 | 10/2008 | Dubrow |
| 2008/0246017 A1 | 10/2008 | Gillies et al. |
| 2009/0162011 A1 | 6/2009 | Coe-Sullivan et al. |
| 2009/0173957 A1 | 7/2009 | Brunner et al. |
| 2010/0051898 A1 | 3/2010 | Kim et al. |
| 2010/0079061 A1 | 4/2010 | Tsai et al. |
| 2010/0103648 A1 | 4/2010 | Kim et al. |
| 2010/0110728 A1 | 5/2010 | Dubrow et al. |
| 2010/0113813 A1 | 5/2010 | Pickett et al. |
| 2010/0123155 A1 | 5/2010 | Pickett et al. |
| 2010/0155749 A1 | 6/2010 | Chen et al. |
| 2010/0167011 A1 | 7/2010 | Dubrow |
| 2010/0176715 A1 | 7/2010 | Bawendi et al. |
| 2010/0193767 A1 | 8/2010 | Naasani et al. |
| 2010/0193806 A1 | 8/2010 | Byun |
| 2010/0265307 A1 | 10/2010 | Linton et al. |
| 2010/0270511 A1 | 10/2010 | Locascio et al. |
| 2010/0283014 A1 | 11/2010 | Breen et al. |
| 2010/0289044 A1 | 11/2010 | Krames et al. |
| 2011/0068321 A1 | 3/2011 | Pickett et al. |
| 2011/0068322 A1 | 3/2011 | Pickett et al. |
| 2011/0081538 A1 | 4/2011 | Linton |
| 2011/0103064 A1 | 5/2011 | Coe-Sullivan et al. |
| 2011/0108799 A1 | 5/2011 | Pickett et al. |
| 2011/0141769 A1 | 6/2011 | Lee et al. |
| 2011/0186811 A1 | 8/2011 | Coe-Sullivan et al. |
| 2011/0241229 A1 | 10/2011 | Naasani et al. |
| 2012/0025155 A1 | 2/2012 | O'Brien et al. |
| 2012/0075837 A1 | 3/2012 | Um |
| 2012/0113671 A1 | 5/2012 | Sadasivan et al. |
| 2012/0113672 A1 | 5/2012 | Dubrow et al. |
| 2012/0119221 A1 | 5/2012 | Negley |
| 2012/0127752 A1 | 5/2012 | Jung |
| 2012/0154417 A1 | 6/2012 | Ninan et al. |
| 2012/0155115 A1 | 6/2012 | Jang |
| 2012/0187367 A1 | 7/2012 | Modi et al. |
| 2012/0189791 A1 | 7/2012 | Modi et al. |
| 2012/0235079 A1 | 9/2012 | Iftime et al. |
| 2012/0256134 A1 | 10/2012 | Nick |
| 2012/0256141 A1 | 10/2012 | Nick et al. |
| 2013/0049040 A1 | 2/2013 | Ramer et al. |
| 2013/0050612 A1 | 2/2013 | Hur et al. |
| 2013/0075014 A1 | 3/2013 | Dubrow |
| 2013/0105839 A1 | 5/2013 | Naasani et al. |
| 2013/0108811 A1 | 5/2013 | Wada et al. |
| 2013/0114301 A1 | 5/2013 | Um |
| 2013/0181603 A1 | 7/2013 | Dubrow et al. |
| 2013/0196460 A1 | 8/2013 | Dubrow et al. |
| 2013/0215136 A1 | 8/2013 | Jiao et al. |
| 2013/0271700 A1 | 10/2013 | Nakamura et al. |
| 2013/0271961 A1 | 10/2013 | Nakamura |
| 2013/0294107 A1 | 11/2013 | Ohkawa et al. |
| 2013/0335677 A1 | 12/2013 | You |
| 2014/0009964 A1 | 1/2014 | Dubrow et al. |
| 2014/0035960 A1 | 2/2014 | You et al. |
| 2014/0036203 A1 | 2/2014 | Guillou et al. |
| 2014/0036532 A1 | 2/2014 | Lee |
| 2014/0036536 A1 | 2/2014 | Gettemy et al. |
| 2014/0036538 A1 | 2/2014 | You et al. |
| 2014/0043790 A1 | 2/2014 | Hyun et al. |
| 2014/0049983 A1 | 2/2014 | Nichol et al. |
| 2014/0153218 A1 | 6/2014 | Hyun |
| 2014/0168571 A1 | 6/2014 | Hyun |
| 2014/0230992 A1 | 8/2014 | Kim et al. |

FOREIGN PATENT DOCUMENTS

| | | |
|---|---|---|
| KR | 100982991 B1 | 9/2010 |
| KR | 20110012246 A | 2/2011 |
| KR | 20110041002 A | 4/2011 |
| KR | 20110065053 A | 6/2011 |
| KR | 20110068109 A | 6/2011 |
| KR | 20120025055 A | 3/2012 |
| KR | 20120048328 A | 5/2012 |
| WO | 2011031876 A1 | 3/2011 |
| WO | 2012011737 A2 | 1/2012 |
| WO | 2012021643 A2 | 2/2012 |
| WO | 2013042470 A1 | 3/2013 |
| WO | 2013078251 A1 | 5/2013 |
| WO | 2013172469 A1 | 11/2013 |
| WO | 2013172470 A1 | 11/2013 |
| WO | 2014073313 A1 | 5/2014 |

OTHER PUBLICATIONS

Bourzac, K., "Colorful Quantum-Dot Displays Coming to Market", MIT Tech. Rev. (2010), http://www.technologyreview.com/news/419213/colorful-quantum-dot-displays-coming-to-market/.

Colegrove, J., "Quantum Dot LED" blog post: http://blog.daum.net/v-phk/15220364 dated Jul. 15, 2010.

Dabbousi, et al., "(CdSe)ZnS Core-shell Quantum Dots: Synthesis and Characterization or a Size Series of Highly Luminescent Nanocrystallites," J. Phys. Chem. B, 101, 9463-9475 (1997).

de Mello et al., "An Improved Experimental Determination of External Photoluminescence Quantum Efficiency", Advanced Materials 9 (3) pp. 230-232 (1997).

Dunlap, et al., "Design of particulate composites for optical applications", Polymer Composites {1991), vol. 12, Issue 1, pp. 39-47.

Greene, K., "More Colorful Displays with Quantum Dots: Nanocrystals improve the efficiency and color range of LCDs", MIT Technology Review, Dec. 10, 2009. www.technologyreview.com/news/416623.

Kazes, et al., "Lasing from CdSe/ZnS Quantum Rods in a Cylindrical Microcavity", MRS Proceedings (2003), vol. 789, 2003 MRS Fall Meeting.

LEDs Magazine, "LG invests in new production plant for LEDs, LCDs", http://www.ledsmagazine.com/articles/2009/09/lg-invests-in-new-production-plant-for-leds-lcds.html, Sep. 2009.

LEDs Magazine, "Quantum dots begin to impact backlight and general illumination applications", ledsmagazine.com, industry news dated Feb. 9, 2010.

(56) References Cited

OTHER PUBLICATIONS

Lee, J., et al., "Full Color Emission from II-VI Semiconductor Quantum Dot-Polymer Composites", Advanced Materials (2000), vol. 12, No. 15, p. 1102.
Murase, et al., "Fabrication of Photoluminescent Small Glass Capsules Containing Quantum Dots at High Concentration", translation of AIST press release dated Jun. 22, 2010 and printed from web site:http://www.aist.go.jp/aist_e/latest_research/2010/20100723/20100723.html on Sep. 6, 2013.
Murray, C., "Synthesis and Characterization of II-VI Quantum Dots and Their Assembly into 3-D Quantum Dot Superlattices", Thesis, Massachusetts Institute of Technology, Sep. 1995.
Murray, C.B., et al., "Synthesis and Characterization of Monodisperse Nanocrystals and Close-Packed Nanocrystal Assemblies", Annu. Rev. Mater. Sci., 2000, 30: pp. 545-610.
Murray, et al., "Synthesis and Characterization of Nearly Monodisperse CdE (E=S, Se, Te) Semiconductor Nanocrystallites", J. Am. Chem. Soc., 115:8706 (1993).
Nam, et al., "Laser cutting and sealing methods of capillary glass tube", Proc. SPIE (2004), vol. 5662, No. 154.
PCT Search Report and Written Opinion dated Mar. 29, 2013 for PCT/US2012/066149. (PCT/US2012/066149 is the parent of the present application.).
ROC (Taiwan) Pat. Appln. No. 101143541, Office Action, dated Apr. 27, 2016. (ROC (Taiwan) Pat. App ln. No. 101143541 is a counterpart of the present application.).
ROC (Taiwan) Pat. Appln. No. 101143541, Search Report, dated Apr. 27, 2016. (ROC (Taiwan) Pat. App ln. No. 101143541 is a counterpart of the present application.).
Sadasivan, et al., "LED Backlighting with Quantum Dots", SID, IDW '10, conference proceeding and abstract of invited paper from the 17th International Display Workshops, held at Fukuoka International Congress Center, Fukuoka, Japan Dec. 1-3, 2010.
Savov, V., "Nanosys and LG Innotek agree deal for newfangled LED-backlit displays", www.engadget.com, press release dated Jan. 22, 2010.
The Economist, "Quantum dots: a quantum leap for lighting", From the print edition: Technology Quarterly, Mar. 4, 2010.
The Economist, "Quantum-dot displays: Dotting the eyes. How tiny crystals can improve picture quality", From the print edition: Science and Technology, Jun. 16, 2011.
Werner, K., "SID LA Chapter Quantum Dots", Presentation dated Jun. 30, 2011, by Kenneth I. Werner, Principal, Nutmeg Consultants, pp. 2-23.
Woo, J.Y., et al., "Thermal behavior of a quantum dot nanocomposite as a color converting material and its application to white LED", Nanotechnology (2010), vol. 21, No. 49.
Yeh, D. et al., "Making white-light-emitting diodes without phosphors", SPIE Illumination & Displays (2008), SPIEDigitallibrary.org.
Yu, H., et al., "Quantum dot and silica nanoparticle doped polymer optical fibers", Optics Express (2007), vol. 15, No. 16.
Taiwanese Patent Office Action—Taiwanese Patent Application No. 101143541 dated Dec. 15, 2016.

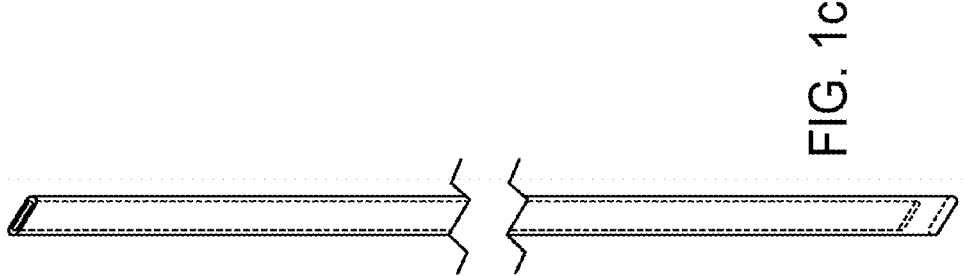
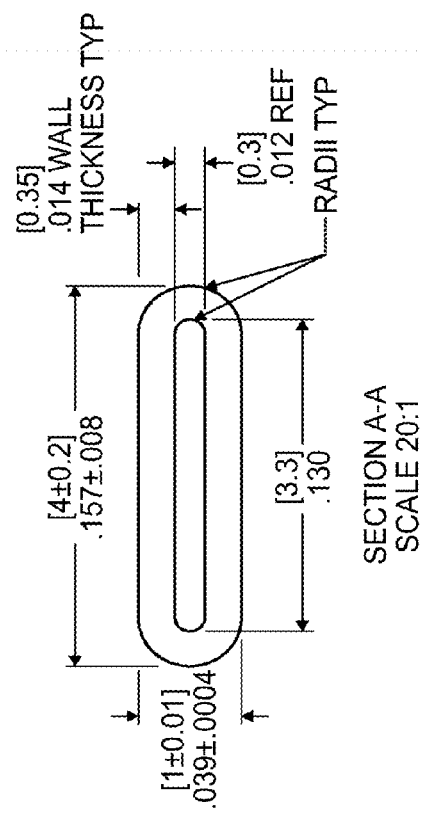
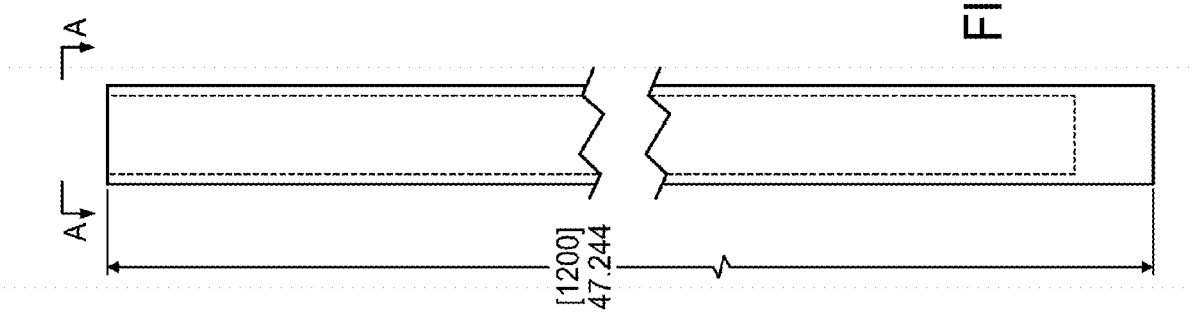

STRESS-RESISTANT COMPONENT FOR USE WITH QUANTUM DOTS

CLAIM OF PRIORITY

This application is a continuation of U.S. patent application Ser. No. 13/682,563, filed 20 Nov. 2012, which claims priority to U.S. Provisional Patent Application No. 61/562,468, filed 22 Nov. 2011, which is hereby incorporated herein by reference in its entirety for all purposes.

TECHNICAL FIELD OF THE INVENTION

The present invention relates to the generation of light using semiconductor nanocrystals, also referred to as quantum dots, included within a capillary structure and their use in structures for lighting and display applications.

BACKGROUND OF INVENTION

Liquid crystal displays (LCDs) are the dominant flat panel display technology in today's market. Conventional LCD systems include a network of optical components in front of a light source (e.g., fluorescent lamps, light emitting diodes (LEDs), etc.) commonly referred to as a backlight unit (BLU). Conventional backlight units include a light source coupled to a light guide through which the light travels eventually to a display panel. LED backlights employed in conventional systems include a set of optical films placed on top of an LED source, a slight distance away from the source. Among other things, the selection of a proper distance between the LED source and the associated optical films ensures that the light entering the display panel is properly optimized.

The quality of an LCD is often measured by a color gamut diagram. The color gamut refers to the total space of colors that may be represented by a display. Generally, the color gamut is shown by diagrams such as the international Commission on Illumination (CIE) 1931 XY color diagram. In this diagram, the gamut of available colors is represented by chromaticity on the x axis and brightness or luminance on the y axis. The gamut of all visible colors on a 2-D CIE plot is generally represented by a tongue shaped area in the center of the diagram.

Increasing the color gamut of a display device increases color quality and also leads to a higher perceived brightness. This effect is known as the Helmholtz-Kohlrauch (H-K) effect, which is defined as "Change in brightness of a perceived color produced by increasing the purity of a color stimulus while keeping its luminance constant within the range of photopic vision." (See CIE Publication No. 17.4, International Lighting Vocabulary, Central Bureau of CIE, Vienna, 1988, sec, 845-02-34, p. 50.) This effect is dependent on ambient lighting conditions (i.e., the effect is enhanced under lower ambient lighting conditions and is diminished under higher ambient lighting conditions).

Two different LED light sources have been utilized in LCDs: (1) the combination of red, green and blue (RGB) LEDs and (2) white LEDs. Compared to the use of white LEDs, the use of RGB LEDs allows for a better color gamut but also adds significant complexity in implementation. The reduced complexity and, therefore reduced cost, of white LED backlights has caused these structures to be the implementation of choice in commercial LCD displays. Thus, some conventional displays have only a 70% color gamut (relative to the 1953 NTSC standard). In addition, some conventional LED sources require numerous color filters in the optical stack which increases power consumption.

LEDs commonly use phosphors to generate white light. The quality, color and directionality of light produced by LEDs are often poor. Optical components including quantum dots can be combined with an LED to produce light of certain wavelengths.

Accordingly, one object of the present invention is to increase performance of solid state lighting devices that utilize optical components including quantum dots.

BRIEF SUMMARY OF THE INVENTION

Embodiments of the present invention are directed to an optical material including quantum dots (including, e.g., semiconductor nanocrystals) to generate light. According to one aspect, a combination of certain quantum dots of the present invention, such as quantum dots that emit green light wavelengths and quantum dots that emit red light wavelengths, that are stimulated by an LED emitting blue light wavelengths results in the generation of trichromatic white light. According to one aspect, the quantum dots are contained within an optical component such as a tube which receives light from an LED. Light generated by the quantum dots is delivered via a light guide for use with display units. According to certain aspects, light generated by quantum dots, such as trichromatic white light, is used in combination with a liquid crystal display (LCD) unit or other optical display unit, such as a display back light unit. One implementation of the present invention is a combination of the quantum dots within a tube, an LED blue light source and a light guide for use as a backlight unit which can be further used, for example, with an LCD unit.

Optical components that include quantum dots according to the present invention include tubes of various configurations, such as length, width, wall thickness, and cross-sectional configuration. The term "tube" as used in the present disclosure includes a capillary, and the term "tube" and "capillary" are used interchangeably. Tubes of the present invention are generally considered light transmissive such that light can pass through the wall of the tube and contact the quantum dots contained therein thereby causing the quantum dots to emit light. Tubes of the present invention are configured to avoid, resist or inhibit cracking due to stresses placed on the tube from polymerizing a matrix therein or heating the tube with the polymerized matrix therein. In this aspect, the tubes of the present invention are glass tubes for use with quantum dots. Such tubes can have a stress-resistant configuration and exhibit advantageous stress-resistant properties. The tube containing the quantum dots is also referred to herein as an optical component. An optical component can be included as part of a display device.

According to one aspect, the tube of the present disclose is made from a transparent material and has a hollow interior. Quantum dots reside within the tube and may be contained within a polymerized matrix material which is light transmissive. A polymerizable composition including quantum dots and at least monomers can be introduced into the tube and then polymerized within the tube using light, for example. The tube may be sealed at one or both ends. The tube has sufficient tolerance or ductility to avoid, resist or inhibit cracking during the curing of the monomers into a polymerized matrix material within the tube. The tube also has sufficient tolerance or ductility to avoid, resist or inhibit cracking during thermal treatment of the tube with the polymerized quantum dot matrix therein. According to certain aspects, the components for making a polymerized quantum dot matrix include polymerizable materials exhibiting ductility when polymerized. According to certain aspects, the components for making a polymerized quantum dot matrix include materials which resist yellowing, browning or discoloration when subject to light. According to one aspect, the combination of the tube of the present invention and the ductile polymerized matrix result in a stress resistant or crack resistant optic.

Embodiments of the present invention are directed to the mixtures or combinations or ratios of quantum dots that are used to achieve certain desired radiation output. Such quantum dots can emit red and green light of certain wavelength when exposed to a suitable stimulus. Still further embodiments are directed to various formulations including quantum dots which are used in various light emitting applications. Formulations including quantum dots may also be referred to herein as "quantum dot formulations" or "optical materials". For example, quantum dot formulations can take the form of flowable, polymerizable fluids, commonly known as quantum dot inks, that are introduced into the tube and then polymerized to form a quantum dot matrix. The tube is then used in combination with a light guide, for example.

Such formulations include quantum dots and a polymerizable composition such as a monomer or an oligomer or a polymer capable of further polymerizing. Additional components include at least one or more of a crosslinking agent, a scattering agent, a rheology modifier, a filler, a photoinitiator and other components useful in producing a polymerizable matrix containing quantum dots. Polymerizable compositions of the present invention include those that avoid yellowing when in the form of a polymerized matrix containing quantum dots. Yellowing leads to a lowering of optical performance by absorbing light emitted by the quantum dots and light emitted by the LED which can lead to a shift in the color point.

Embodiments of the present invention are still further directed to various backlight unit designs including the quantum dot-containing tubes, LEDs, and light guides for the efficient transfer of the generated light to and through the light guide for use in liquid crystal displays. According to certain aspects, methods and devices are provided for the illumination and stimulation of quantum dots within tubes and the efficient coupling or directing of resultant radiation to and through a light guide.

Additional aspects include providing a tube design, having one or both ends sealed, which withstands stresses relating to polymerization of a polymerizable quantum dot formulation therein or stresses relating to heating the tube containing the polymerized quantum dot matrix therein. Such tube design advantageously avoids, resists or inhibits cracking from such stresses which can allow oxygen into the tube. Oxygen and/or water may degrade quantum dots during periods of high light flux exposure. Accordingly, an optical component including a glass tube having advantageous or improved stress-resistant properties can improve the performance of a polymerized quantum dot-containing matrix disposed therein.

Embodiments are further provided for a backlight unit including quantum dots within a stress-resistant tube such as a glass tube described herein having each end sealed and positioned within the backlight unit, and component to, an LED. Preferably, a polymer matrix that avoids, resists or inhibits yellowing is utilized. Such a polymerized quantum dot matrix may have a component that increases ductility of the matrix which avoids, resists or inhibits cracking of the matrix due to shrinkage. One exemplary material is lauryl methacrylate. Such an LED of the present invention utilizes quantum dots to increase color gamut and generate higher perceived brightness.

Embodiments are further provided for a display including an optical component taught herein.

Embodiments are still further provided for a device (e.g., but not limited to, a light-emitting device) including an optical component taught herein.

Each of the original claims set forth at the end of the present application are hereby incorporated into this Summary section by reference in its entirety.

The foregoing, and other aspects and embodiments described herein all constitute embodiments of the present invention.

It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

It is to be understood that both the foregoing general description and the following detailed description are exemplary and explanatory only and are not restrictive of the invention as claimed. Other embodiments will be apparent to those skilled in the art from consideration of the specification and practice of the invention disclosed herein.

BRIEF DESCRIPTION OF THE DRAWINGS

In the drawings:

FIGS. 1A, 1B and 1C are drawings of a tube of the present invention. FIG. 1A is a face view of a tube of the present invention. FIG. 1B is a sectional view along line A-A of FIG. 1A. FIG. 1C is a perspective view of a tube of the present invention.

Figure 2:
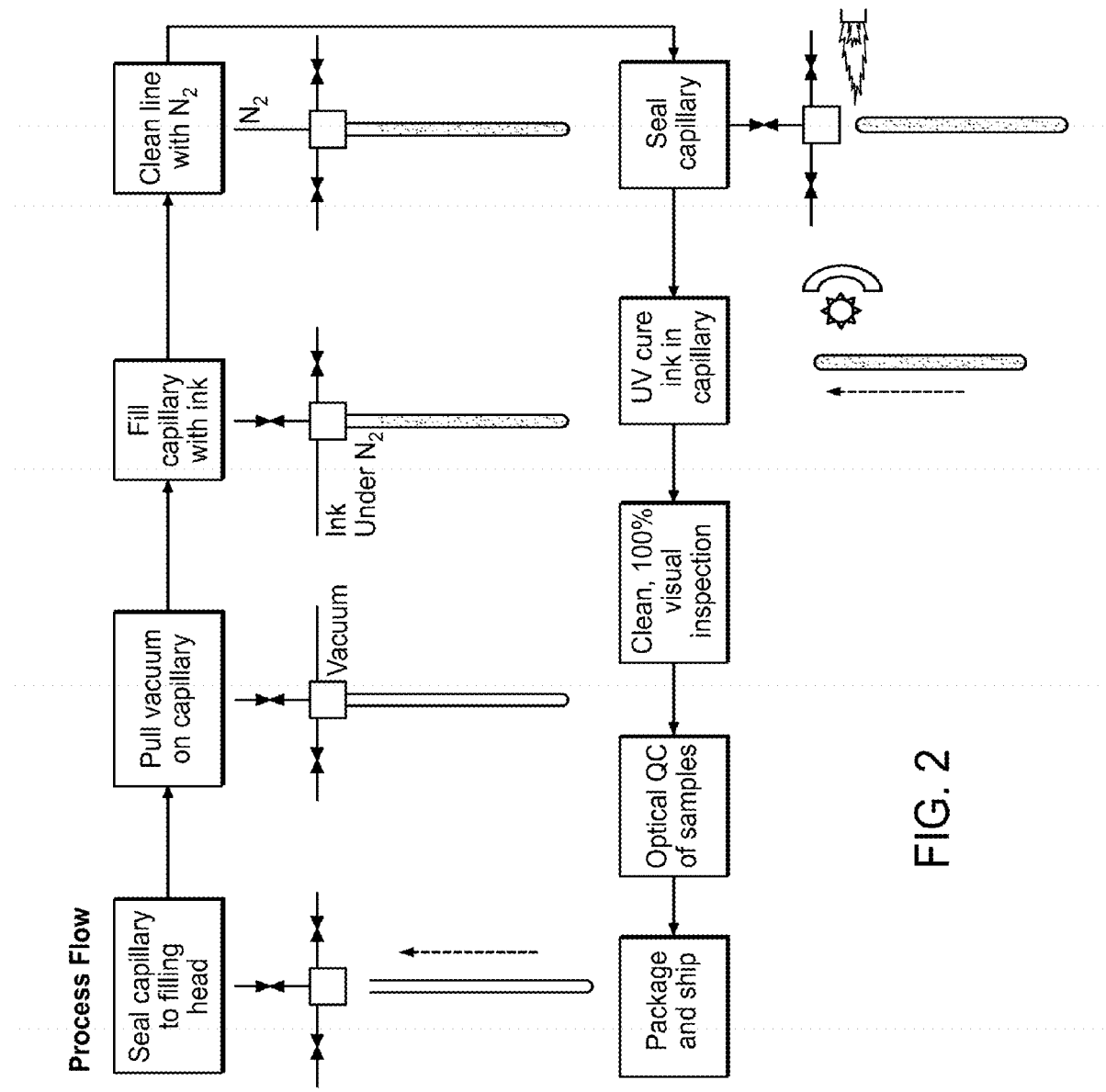
FIG. 2 is a flow chart describing a capillary fill procedure.

The attached figures are simplified representations presented for purposes of illustration only; the actual structures may differ in numerous respects, including, e.g., relative scale, etc.

For a better understanding to the present invention, together with other advantages and capabilities thereof, reference is made to the following disclosure and appended claims in connection with the above-described drawings.

DETAILED DESCRIPTION OF THE INVENTION

Embodiments of the present invention are directed to the use of a stress-resistant tube such as a glass tube described herein that includes semiconductor nanocrystals, known as quantum dots, in combination with a stimulating light to produce light of one or more wavelengths including, e.g., trichromatic white light which can be used in various lighting applications such as back light units for liquid crystal displays. The glass tube is preferably light transmissive. The glass tube described herein in combination with the quantum dots is also referred to herein as an optical component.

According to certain aspects of the present invention, a vessel in the shape of a tube is provided which includes quantum dots. The tube is hollow and can be fashioned from various light transmissive materials including glass.

According to one aspect, the tube has a stress-resistant or stress-tolerant configuration and exhibits stress-resistant or stress-tolerant properties when subjected to stresses from polymerizing a formulation therein or heating the tube with the polymerized formulation therein. According to this aspect, a glass tube with such stress-resistant or stress tolerant properties avoids, resists or inhibits cracking due to stresses during manufacture of an optical component including the glass tube, manufacture and/or use in a display device, and during cycling of the display device. According to an additional aspect, a glass tube with such stress-resistant or stress tolerant properties having a polymer matrix therein that includes a material that provides ductility avoids, resists or inhibits cracking due to stresses during manufacture of an optical component including the glass tube, manufacture and/or use in a display device, and during cycling of the display device. The tube has dimensions suitable for application within a display device. The glass tube may include borosilicates. The glass tube may include soda lime. The glass tube may include borosilicates and soda lime. The glass tube may be made from other materials besides borosilicates or soda lime or may be made from materials in addition to borosilicates or soda lime. According to one aspect, borosilicates are preferred materials for glass tubes of the present invention.

A tube within the scope of the present invention has a length of between about 500 min and about 1500 mm or between about 500 mm and 1200 mm and usually has a length comparable to a light guide within a display device. A tube within the scope of the present invention has a wall thickness sufficient to withstand stresses due to the polymerization of the quantum dot matrix and heating of the tube and matrix combination. Suitable wall thicknesses include a thickness between about 250 microns and about 700 microns, about 275 microns and about 650 microns, about 300 microns and about 500 microns, about 325 microns and about 475 microns, about 350 microns and about 450 microns, and about 350 microns and about 650 microns and any value or range in between whether overlapping or not. Other thicknesses may be used based on the intended end-use application.

According to certain embodiments, the tube has a cross-sectional wall configuration which produces stress-resistant or stress tolerant properties. Configurations may include a circle, a rounded square, an oval, a racetrack configuration having parallel sides with full radius ends, and the like. According to certain aspects, the cross-sectional configuration has a wall to wall outer major dimension between about 0.5 mm and about 4.0 mm and a wall to wall inner minor dimension between about 0.15 mm and about 3.3 mm.

FIGS. 1A, 1B and 1C depict an example of a tube in accordance with the present invention. FIG. 1A shows a face view of an example of a tube of in accordance with the present invention. FIG. 1B depicts in schematic form a sectional view along line A-A of FIG. 1A, showing a tube having a cross-sectional wall design in the configuration of a racetrack. According to this aspect, the wall of the tube includes a first full semicircle or radius end and a second full semicircle or radius end. The first full radius end and the second full radius end are connected by first and second substantially parallel walls. An exemplary tube having a cross-sectional configuration of a racetrack is characterized as being stress-resistant or stress-tolerant to the stresses or load on the tube due to polymerization and curing of a polymerizable quantum dot formulation within the tube and additional stresses from heating the tube with the polymerized quantum dot matrix therein. Such an exemplary tube is referred to herein as a stress-resistant tube or stress-tolerant tube. FIG. 1C shows a perspective view of an example of a tube in accordance with the present invention.

According to one aspect, the walls are straight or flat and provide a consistent or uniform path length through the tube and accordingly through the quantum dot matrix therein through which photons from an LED may pass. The substantially parallel and straight walls also advantageously provide a flat face to couple the tube to a corresponding flat end of a light guide plate of a back light unit. According to one aspect, the tube with the race track configuration has a cross-sectional diameter of between about 0.5 mm and about 5.0 mm in the elongate direction (major dimension) and between about 0.15 mm and about 3.3 mm in the width direction (minor dimension). One example of a suitable cross sectional diameter is about 4 mm in the elongate direction by about 1 mm in the width direction. According to one aspect, the full radius ends advantageously bear higher loads than square cornered tubes.

As can be seen in FIG. 1B, the tube has a uniform wall thickness. Such a wall thickness can be within the range of between about 60 and about 700 microns. However, it is to be understood that the wall thickness may be uniform or nonuniform, i.e. of varying thickness. For example, the full radius ends of the tube may be thicker than the straight wall portions so as to provide greater stability. For example and with reference to the cross-section of the tube, the full radius ends of the tube may be thinner than the straight wall portions. For purposes of this aspect, the wall thicknesses are measured as the distance between the outer faces and the inner faces of the walls of the tube. The straight wall portions may be considered to have a uniform thickness or substantially uniform thickness along the length of the straight wall to a point where the straight wall terminates and a full radius end begins. The full radius end may be considered to have a uniform thickness or substantially uniform thickness along the length of the full radius end to a point where the full radius end terminates and the straight wall portion begins. According to this aspect, the full radius end has a thickness along its length which is smaller than the thickness along the length of the straight wall portion. According to this aspect, the full radius end has an average thickness along its length which is smaller than the average thickness along the length of the straight wall portion. Such an exemplary tube where the thickness of the full radius ends is smaller than the thickness of the straight wall portion exhibits less blue light leakage. Such an exemplary tube where the thickness of the full radius ends is smaller than the thickness of the straight wall portion exhibits enhanced color conversion. One exemplary wall thickness is between about 310 microns and about 390 microns, such as about 315 microns or about 380 microns. Such a wall thickness advantageously inhibits breakage of the tube during processing. As shown in FIG. 1B, the walls define an interior volume into which quantum dots are to be provided in the form of a matrix. The interior volume is dependent upon the dimensions of the stress-resistant tube. However, suitable volumes include between about 0.0015 ml and about 2.0 ml. In addition, stress-resistant tubes of the present invention have a ratio of the cross-sectional area of the matrix to the cross-sectional area of the wall of less than or equal to about 0.35. An exemplary ratio characteristic of a stress-resistant tube is about 0.35.

Figure 6:
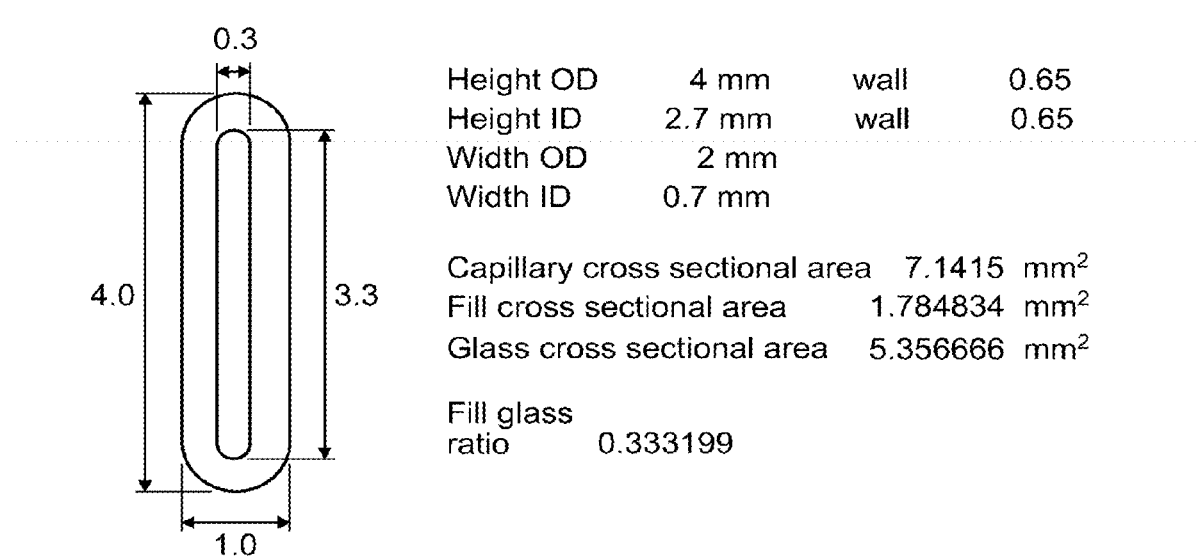
FIG. 6 depicts a cross-section of a drawing of an example of an embodiment of a tube in accordance with the present invention.

In addition to having full radius ends, capillaries of the present invention preferably have a predetermined ratio of glass wall thickness to the volume of internal matrix. Control of such ratio can allow the capillary to bear stress loads set up by both the shrinkage of the matrix monomers upon polymerization as well as the differential expansion and contraction of the polymer/glass system on thermal cycling. For example, for a capillary containing a cross-linked LMA/EGDMA matrix system (e.g., described elsewhere herein), a matrix cross sectional area to glass cross sectional area ratio below 0.35 can be preferred, although ratios as high as 0.7 can also be beneficial for capillaries prepared from direct drawn glass. FIG. 6 depicts a cross-section of a drawing of an example of an embodiment of a tube in accordance with the present invention showing dimensions related to this ratio.

According to one aspect, the length of the tube is selected based on the length of the side of the light guide plate of the backlight unit along which it is positioned. Such lengths include between about 50 mm and about 1500 mm with the optically active area spanning substantially the entire length of the tube. An exemplary length is about 1100 mm or about 1200 mm. It is to be understood that the length of the tube can be shorter than, equal to, or longer than the length of the light guide plate.

According to one aspect, one or both ends of the glass tube may be sealed. The seal can be of any size or length. One exemplary dimension is that the distance from the end of the capillary to the beginning of the optically active area is between about 2 mm to about 8 mm, with about 3 mm or 5 mm being exemplary. Sealing methods and materials are known to those of skill in the art and include glass seal, epoxy, silicone, acrylic, light or heat curable polymers and metal. A commercially available sealing material is CERA-SOLZER available from MBR Electronics GmbH (Switzerland). Suitable metals or metal solders useful as sealing materials to provide a hermetic seal and good glass adhesion include indium, indium tin, and indium tin and bismuth alloys, as well as eutetics of tin and bismuth. One exemplary solder includes indium #316 alloy commercially available front McMaster-Carr. Sealing using solders may be accomplished using conventional soldering irons or ultrasonic soldering baths known to those of skill in the art. Ultrasonic methods provide fluxless sealing using indium solder in particular. Seals include caps of the sealing materials having dimensions suitable to fit over and be secured to an end of the tube. According to one embodiment, one end of the tube is sealed with glass and the other end is sealed with epoxy. According to one aspect, the glass tube with a quantum dot matrix therein is hermetically sealed. Examples of sealing techniques include but are not limited to, (1) contacting an open end of a tube with an epoxy, (2) drawing the epoxy into the open end due to shrinkage action of a curing resin, or (3) covering the open end with a glass adhering metal such as a glass adhering solder or other glass adhering material, and (4) melting the open end by heating the glass above the melting point of the glass and pinching the walls together to close the opening to form a molten glass hermetic seal.

In certain embodiments, for example, a tube is filled with a liquid quantum dot formulation and UV cured in a nitrogen atmosphere. According to one aspect, a stress-resistant tube, such as a borosilicate glass tube having a configuration described herein, is filled under oxygen free conditions with the quantum dot formulation of Example III. Glass capillaries are maintained under conditions of suitable time, pressure and temperature sufficient to dry the glass capillaries. A quantum dot ink formulation of Example III is maintained in a quantum dot ink vessel under nitrogen. Dried capillaries with one end open are placed into a vacuum fill vessel with an open end down into quantum dot ink. The quantum dot ink vessel is connected to the vacuum fill vessel via tubing and valves such that ink is able to flow from the quantum dot ink vessel to the vacuum fill vessel by applying pressure differentials. The pressure within the vacuum fill vessel is reduced to less than 200 mtorr and then repressurized with nitrogen. Quantum dot ink is admitted into the vacuum fill vessel by pressurization of the quantum dot ink vessel and the capillaries are allowed to fill under oxygen free conditions. Alternatively, the vacuum fill vessel can be evacuated thereby drawing the fluid up into the capillaries. After the capillaries are filled, the system is bled to atmospheric pressure. The exterior of the capillaries are then cleaned using toluene.

According to an additional embodiment with reference to FIG. 2, a capillary with one end sealed is connected to a filling or manifold head capable of docking with the capillary and switching between vacuum and ink fill. The capillary is evacuated by a vacuum having a vacuum capability of less than 200 mTorr. Quantum dot ink under nitrogen pressure is then filled into the capillary. The lines and filling head are flushed with nitrogen. The capillary is held under an atmosphere of nitrogen or vacuum and the end sealed, such as by melting the capillary end and sealing, for example by a capillary sealing system. The ink may then be cured in the capillary using UV light in a UV curing apparatus for curing quantum dot ink.

In certain embodiments, for example, the ink can be cured with an H or D bulb emitting 900-1000 mjoules/cm$^2$ with a total dosage over about 1 to about 5 minutes. Alternatively, curing can be accomplished using a Dymax 500EC UV Curing Flood system equipped with a mercury UVB bulb. In such case, a lamp intensity (measured as 33 mW/cm$^2$ at a distance of about 7" from the lamp housing) can be effective, with the capillary being cured for 10-15 seconds on each side while being kept at a distance of 7 inches from the lamp housing. After curing, the edges of the capillary can be sealed.

In certain embodiments relating to a temporary seal, sealing can comprise using an optical adhesive or silicone to seal one or both ends or edges of the capillary. For example, a drop of optical adhesive can be placed on each edge of the capillary and cured. An example of an optical adhesive includes, but is not limited to, NOA-68T obtainable from Norland Optics. For example, a drop of such adhesive can be placed on each edge of the capillary and cured (e.g., for 20 seconds with a Rolence Enterprise Model Q-Lux-UV lamp).

In certain embodiments, sealing can comprise using glass to seal one or both ends or edges of the capillary. This can be done by briefly bringing a capillary filled with cured quantum dot ink into brief contact with an oxygen/Mapp gas flame until the glass flows and seals the end. Oxygen-hydrogen flames may be used as well as any other mixed gas flame. The heat may also be supplied by laser eliminating the need for an open flame. In certain embodiments, both ends of a capillary filled with uncured quantum dot ink can be sealed, allowing the ink to then be photocured in the sealed capillary.

In certain embodiments, the capillary is hermetically sealed, i.e., impervious to gases and moisture.

In certain embodiments, the capillary is pseudo-hermetically sealed, i.e., at least partially impervious to gases and moisture.

Other suitable techniques can be used for sealing the ends or edges of the capillary.

In certain aspects and embodiments of the inventions taught herein, the stress-resistant tube including the cured quantum dot formulation (optical material) may optionally be exposed to light flux for a period of time sufficient to increase the photoluminescent efficiency of the optical material.

In certain embodiments, the optical material is exposed to light and heat for a period of time sufficient to increase the photoluminescent efficiency of the optical material.

In preferred certain embodiments, the exposure to light or light and heat is continued for a period of time until the photoluminescent efficiency reaches a substantially constant value.

In one embodiment, for example, after the optic is filled with quantum dot containing ink, cured, and sealed (regardless of the order in which the curing and sealing steps are conducted), the optic is exposed, to 25-35 mW/cm$^2$ light flux with a wavelength in a range from about 365 nm to about 470 nm, while at a temperature in a range from about 25° C. to about 80° C., for a period of time sufficient to increase the photoluminescent efficiency of the ink. In one embodiment, for example, the light has a wavelength of about 450 nm, the light flux is 30 mW/cm$^2$, the temperature 80° C., and the exposure time is 3 hours. Alternatively, the quantum dot containing ink can be cured within the tube before sealing one or both ends of the tube.

According to one aspect of the present invention, a polymerizable composition including quantum dots is provided. Quantum dots may be present in the polymerizable composition in an amount from about 0.05% w/w to about 5.0% w/w. According to one aspect, the polymerizable composition is photopolymerizable. The polymerizable composition is in the form of a fluid which can be placed within the tube and then one or both ends sealed with the tube being hermetically sealed to avoid oxygen being within the tube. The polymerizable composition is then subjected to light of sufficient intensity and for a period of time sufficient to polymerize the polymerizable composition, and in one aspect, in the absence of oxygen. The period of time can range between about 10 seconds to about 6 minutes or between about 1 minute to about 6 minutes. According to one embodiment, the period of time is sufficiently short to avoid agglomeration of the quantum dots prior to formation of a polymerized matrix. Agglomeration can result in FRET and subsequent loss of photoluminescent performance.

The polymerizable composition includes quantum dots in combination with one or more of a polymerizable composition. According to one aspect, the polymerizable composition avoids, resists or inhibits yellowing when in the form of a matrix, such as a polymerized matrix. A matrix in which quantum dots are dispersed may be referred to as a host material. Host materials include polymeric and non-polymeric materials that are at least partially transparent, and preferably fully transparent, to preselected wavelengths of light.

According to an additional aspect, the polymerizable composition is selected so as to provide sufficient ductility to the polymerized matrix. Ductility is advantageous in relieving the stresses on the tube that occur during polymer shrinkage when the polymer matrix is cured. Suitable polymerizable compositions act as solvents for the quantum dots and so combinations of polymerizable compositions can be selected based on solvent properties for various quantum dots.

Polymerizable compositions include monomers and oligomers and polymers and mixtures thereof. Exemplary monomers include lauryl methacrylate, norbornyl methacrylate, Ebecyl 150 (Cytec), CD590 (Cytec) and the like. Polymerizable materials can be present in the polymerizable formulation in an amount greater than 50 weight percent. Examples include amounts in a range greater than 50 to about 99.5 weight percent, greater than 50 to about 98 weight percent, greater than 50 to about 95 weight percent, from about 80 to about 99.5 weight percent, from about 90 to about 99.95 weight percent, from about 95 to about 99.95 weight percent. Other amounts outside these examples may also be determined to be useful or desirable.

Exemplary polymerizable compositions further include one or more of a crosslinking agent, a scattering agent, a rheology modifier, a filler, and a photoinitiator.

Suitable crosslinking agents include ethylene glycol dimethacrylate, Ebecyl 150 and the like. Crosslinking agents can be present in the polymerizable formulation in an amount between about 0.5 wt % and about 30.0 wt %. In certain embodiments, crosslinking agents can be present in the polymerizable formulation in an amount between about 0.5 wt % and about 3.0 wt %. Crosslinking agents are generally added, for example in an amount of 1% w/w, to improve stability and strength of a polymer matrix which helps avoid cracking of the matrix due to shrinkage upon curing of the matrix.

Suitable scattering agents include $TiO_2$, alumina, barium sulfate, PTFE, barium titanate and the like. Scattering agents can be present in the polymerizable formulation in an amount between about 0.05 wt % and about 1.0 wt %. Scattering agents are generally added, for example in a preferred amount of about 0.15% w/w, to promote outcoupling of emitted light.

Suitable rheology modifiers (thixotropes) include fumed silica commercially available from Cabot Corporation such as TS-720 treated fumed silica, treated silica commercially available from Cabot Corporation such as TS720, TS500, TS530, TS610 and hydrophilic silica such as M5 and EHS commercially available from Cabot Corporation. Rheology modifiers can be present in the polymerizable formulation in an amount between about 5% w/w to about 12% w/w. Rheology modifiers or thixotropes act to lower the shrinkage of the matrix resin and help prevent cracking. Hydrophobic rheology modifiers disperse more easily and build viscosity at higher loadings allowing for more filler content and less shrinkage to the point where the formulation becomes too viscous to fill the tube. Rheology modifiers such as fumed silica also provide higher EQE and help to prevent settling of $TiO_2$ on the surface of the tube before polymerization has taken place.

Suitable fillers include silica, fumed silica, precipitated silica, glass beads, PMMA beads and the like. Fillers can be present in the polymerizable formulation in an amount between about 0.01% and about 60%, about 0.01% and about 50%, about 0.01% and about 40%, about 0.01% and about 30%, about 0.01% and about 20% and any value or range in between whether overlapping or not.

Suitable photoinitiators include Irgacure 2022, KTO-46 (Lambert), Esacure 1 (Lambert) and the like. Photoinitiators can be present in the polymerizable formulation in an amount between about 1% w/w to about 5% w/w. Photoinitiators generally help to sensitize the polymerizable composition to UV light for photopolymerization.

In certain embodiments, a polymerizable quantum dot formulation may further include an emission stabilizer, as described in commonly-owned U.S. Provisional Application No. 61/562,469 filed 22 Nov. 2011.

According to additional aspects, quantum dots are nanometer sized particles that can have optical properties arising from quantum confinement. The particular composition(s), structure, and/or size of a quantum dot can be selected to achieve the desired wavelength of light to be emitted from the quantum clot upon stimulation with a particular excitation source. In essence, quantum dots may be tuned to emit light across the visible spectrum by changing their size. See C. B. Murray, C. R. Kagan, and M. G. Bawendi, *Annual Review of Material Sci.,* 2000, 30: 545-610 hereby incorporated by reference in its entirety.

Quantum clots can have an average particle size in a range from about 1 to about 1000 nanometers (nm), and preferably in a range from about 1 to about 100 nm. In certain embodiments, quantum dots have an average particle size in a range from about 1 to about 20 nm (e.g., such as about 5, 6, 7, 8, 9, 10, 11, 12, 13, 14, 15, 16, 17, 18, 19, or 20 nm). In certain embodiments, quantum dots have an average particle size in a range from about 1 to about 10 nm. Quantum dots can have an average diameter less than about 150 Angstroms (Å). In certain embodiments, quantum dots having an average diameter in a range from about 12 to about 150 Å can be particularly desirable. However, depending upon the composition, structure, and desired emission wavelength of the quantum dot, the average diameter may be outside of these ranges.

Preferably, a quantum dot comprises a semiconductor nanocrystal. In certain embodiments, a semiconductor nanocrystal has an average particle size in a range from about 1 to about 20 nm, and preferably from about 1 to about 10 am. However, depending upon the composition, structure, and desired emission wavelength of the quantum dot, the average diameter may be outside of these ranges.

A quantum dot can comprise one or more semiconductor materials.

Examples of semiconductor materials that can be included in a quantum dot (including, e.g., semiconductor nanocrystal) include, but are not limited to, a Group IV element, a Group II-VI compound, a Group II-V compound, a Group compound, a Group III-V compound, a Group IV-VI compound, a Group I-III-VI compound, a Group II-IV-VI compound, a Group II-IV-V compound, an alloy including any of the foregoing, and/or a mixture including any of the foregoing, including ternary and quaternary mixtures or alloys. A non-limiting list of examples include ZnO, ZnS, ZnSe, ZnTe, CdO, CdS, CdSe, CdTe, MgS, MgSe, GaAs, GaN, GaP, GaSe, GaSb, HgO, HgS, HgSe, HgTe, InAs, InN, InP, InSb, AlAs, AlN, AlP, AlSb, TlN, TlP, TlAs, TlSb, PbO, PbS, PbSe, PbTe, Ge, Si, an alloy including any of the foregoing, and/or a mixture including any of the foregoing, including ternary and quaternary mixtures or alloys.

In certain embodiments, quantum dots can comprise a core comprising one or more semiconductor materials and a shell comprising one or more semiconductor materials, wherein the shell is disposed over at least a portion, and preferably all, of the outer surface of the core. A quantum dot including a core and shell is also referred to as a "core/shell" structure.

For example, a quantum dot can include a core having the formula MX, where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof. Examples of materials suitable for use as quantum dot cores include, but are not limited to, ZnO, ZnS, ZnSe, ZnTe, CdO, CdS, CdSe, CdTe, MgS, MgSe, GaAs, GaN, GaP, GaSe, GaSb, HgO, HgS, HgSe, HgTe, InAs, InN, InP, InSb, AlAs, AlN, AlP, AlSb, TlN, TlP, TlAs, TlSb, PbO, PbS, PbSe, PbTe, Ge, Si, an alloy including any of the foregoing, and/or a mixture including any of the foregoing, including ternary and quaternary mixtures or alloys.

A shell can be a semiconductor material having a composition that is the same as or different from the composition of the core. The shell can comprise an overcoat including one or more semiconductor materials on a surface of the core. Examples of semiconductor materials that can be included in a shell include, but are not limited to, a Group IV element, a Group II-VI compound, a Group II-V compound, a Group III-VI compound, a Group III-V compound, a Group IV-VI compound, a Group I-III-VI compound, a Group II-IV-VI compound, a Group II-IV-V compound, alloys including any of the foregoing, and/or mixtures including any of the foregoing, including ternary and quaternary mixtures or alloys. Examples include, but are not limited to, ZnO, ZnS, ZnSe, ZnTe, CdO, CdS, CdSe, CdTe, MgS, MgSe, GaAs, GaN, GaP, GaSe, GaSb, HgO, HgS, HgSe, HgTe, InAs, InN, InP, InSb, AlAs, AlN, AlP, AlSb, TlN, TlP, TlAs, TlSb, PbO, PbS, PbSe, PbTe, Ge, Si, an alloy including any of the foregoing, and/or a mixture including any of the foregoing. For example, ZnS, ZnSe or CdS overcoatings can be grown on CdSe or CdTe semiconductor nanocrystals.

In a core/shell quantum dot, the shell or overcoating may comprise one or more layers. The overcoating can comprise at least one semiconductor material which is the same as or different from the composition of the core. Preferably, the overcoating has a thickness from about one to about ten monolayers. An overcoating can also have a thickness greater than ten monolayers. In certain embodiments, more than one overcoating can be included on a core.

In certain embodiments, the surrounding "shell" material can have a band gap greater than the band gap of the core material. In certain other embodiments, the surrounding shell material can have a band gap less than the band gap of the core material.

In certain embodiments, the shell can be chosen so as to have an atomic spacing close to that of the "core" substrate. In certain other embodiments, the shell and core materials can have the same crystal structure.

Examples of quantum dot (e.g., semiconductor nanocrystal) (core)shell materials include, without limitation: red (e.g., (CdSe)CdZnS (core)shell), green (e.g., (CdZnSe) CdZnS (core)shell, etc.), and blue (e.g., (CdS)CdZnS (core) shell.)

Quantum clots can have various shapes, including, but not limited to a sphere, rod, disk, other shapes, and mixtures of various shaped particles.

One example of a method of manufacturing a quantum dot (including, for example, but not limited to, a semiconductor nanocrystal) is a colloidal growth process. Colloidal growth occurs by injection of an M donor and an X donor into a hot coordinating solvent. One example of a preferred method for preparing monodisperse quantum dots comprises pyrolysis of organometallic reagents, such as dimethyl cadmium, injected into a hot, coordinating solvent. This permits discrete nucleation and results in the controlled growth of macroscopic quantities of quantum dots. The injection produces a nucleus that can be grown in a controlled manner to form a quantum dot. The reaction mixture can be gently heated to grow and anneal the quantum dot. Both the average size and the size distribution of the quantum dots in a sample are dependent on the growth temperature. The growth temperature for maintaining steady growth increases with increasing average crystal size. Resulting quantum dots are members of a population of quantum dots. As a result of the discrete nucleation and controlled growth, the population of quantum dots that can be obtained has a narrow, monodisperse distribution of diameters. The monodisperse distribution of diameters can also be referred to as a "size." Preferably, a monodisperse population of particles includes a population of particles wherein at least about 60% of the particles in the population fall within a specified particle size range. A population of monodisperse particles preferably deviate less than 15% rms (root-mean-square) in diameter and more preferably less than 10% rms and most preferably less than 5%.

An example of air overcoating process is described, for example, in U.S. Pat. No. 6,322,901. By adjusting the temperature of the reaction mixture during overcoating and monitoring the absorption spectrum of the core, overcoated materials having high emission quantum efficiencies and narrow size distributions can be obtained.

The narrow size distribution of the quantum dots (including, e.g., semiconductor nanocrystals) allows the possibility of light emission in narrow spectral widths. Monodisperse semiconductor nanocrystals have been described in detail in Murray et al. (*J. Am. Chem. Soc.,* 115:8706 (1993)) and in the thesis of Christopher Murray, entitled "Synthesis and Characterization of II-VI Quantum Dots and Their Assembly into 3-D Quantum Dot Superlattices", Massachusetts Institute of Technology, September, 1995. The foregoing are hereby incorporated herein by reference in their entireties.

The process of controlled growth and annealing of the quantum dots in the coordinating solvent that follows nucleation can also result in uniform surface derivatization and regular core structures. As the size distribution sharpens, the temperature can be raised to maintain steady growth. By adding more M donor or X donor, the growth period can be shortened. The M donor can be an inorganic compound, an organometallic compound, or elemental metal. For example, an M donor can comprise cadmium, zinc, magnesium, mercury, aluminum, gallium, indium or thallium, and the X donor can comprise a compound capable of reacting with the M donor to form a material with the general formula MX. The X donor can comprise a chalcogenide donor or a pnictide donor, such as a phosphine chalcogenide, a bis (silyl) chalcogenide, dioxygen, an ammonium salt, or a tris(silyl) pnictide. Suitable X donors include, for example, but are not limited to, dioxygen, bis(trimethylsilyl) selenide ($(TMS)_2Se$), trialkyl phosphine selenides such as (tri-noctylphosphine) selenide (TOPSe) or (tri-n-butylphosphine) selenide (TBPSe), trialkyl phosphine tellurides such as (tri-n-octylphosphine) telluride (TOPTe) or hexapropylphosphorustriamide telluride (HPPTTe), bis(trimethylsilyl)telluride (($TMS)_2Te$), bis(trimethylsilyl)sulfide (($TMS)_2S$), a trialkyl phosphine sulfide such as (tri-noctylphosphine) sulfide (TOPS), an ammonium salt such as an ammonium halide (e.g., $NH_4Cl$), tris(trimethylsilyl) phosphide (($TMS)_3P$), tris(trimethylsilyl) arsenide (($TMS)_3$As), or tris(trimethylsilyl) antimonide (($TMS)_3Sb$). In certain embodiments, the M donor and the X donor can be moieties within the same molecule.

A coordinating solvent can help control the growth of the quantum dot. A coordinating solvent is a compound having a donor lone pair, for example, a lone electron pair available to coordinate to a surface of the growing quantum dot (including, e.g., a semiconductor nanocrystal). Solvent coordination can stabilize the growing quantum dot. Examples of coordinating solvents include alkyl phosphines, alkyl phosphine oxides, alkyl phosphonic acids, or alkyl phosphinic acids, however, other coordinating solvents, such as pyridines, furans, and amines may also be suitable for the quantum dot (e.g., semiconductor nanocrystal) production. Additional examples of suitable coordinating solvents include pyridine, tri-n-octyl phosphine (TOP), tri-n-octyl phosphine oxide (TOPO) and trishydroxylpropylphosphine (tHPP), tributylphosphine, tri(dodecyl)phosphine, dibutylphosphite, tributyl phosphite, trioctadecyl phosphite, trilauryl phosphite, tris(tridecyl) phosphite, triisodecyl phosphite, bis(2-ethylhexyl)phosphate, tris(tridecyl) phosphate, hexadecylamine, oleylamine, octadecylamine, bis(2-ethylhexyl) amine, octylamine, dioctylamine, trioctylamine, dodecylamine/laurylamine, didodecylamine tridodecylamine, hexadecylamine, dioctadecylamine, trioctadecylamine, phenylphosphonic acid, hexylphosphonic acid, tetradecylphosphonic acid, octylphosphonic acid, octadecylphosphonic acid, propylenediphosphonic acid, phenylphosphonic acid, aminohexylphosphonic acid, dioctyl ether, diphenyl ether, methyl myristate, octyl octanoate, N-dodecylpyrrolidone (NDP) and hexyl octanoate. In certain embodiments, technical grade TOPO can be used.

In certain embodiments, quantum dots can alternatively be prepared with use of non-coordinating solvent(s).

Size distribution during the growth stage of the reaction can be estimated by monitoring the absorption or emission line widths of the particles. Modification of the reaction temperature in response to changes in the absorption spectrum of the particles allows the maintenance of a sharp particle size distribution during growth. Reactants can be added to the nucleation solution during crystal growth to grow larger crystals. For example, for CdSe and CdTe, by stopping growth at a particular semiconductor nanocrystal average diameter and choosing the proper composition of the semiconducting material, the emission spectra of the semiconductor nanocrystals can be tuned continuously over the wavelength range of 300 nm to 5 microns, or from 400 nm to 800 nm.

The particle size distribution of the quantum dots (including, e.g., semiconductor nanocrystals) can be further refined by size selective precipitation with a poor solvent for the quantum dots, such as methanol/butanol. For example, quantum dots can be dispersed in a solution of 10% butanol in hexane. Methanol can be added dropwise to this stirring solution until opalescence persists. Separation of supernatant and flocculate by centrifugation produces a precipitate enriched with the largest crystallites in the sample. This procedure can be repeated until no further sharpening of the optical absorption spectrum is noted. Size-selective precipitation can be carried out in a variety of solvent/nonsolvent pairs, including pyridine/hexane and chloroform/methanol. The size-selected quantum dot (e.g., semiconductor nanocrystal) population preferably has no more than a 15% rms deviation from mean diameter, more preferably 10% rms deviation or less, and most preferably 5% rms deviation or less.

Semiconductor nanocrystals and other types of quantum dots preferably have ligands attached thereto. According to one aspect, quantum dots within the scope of the present invention include green CdSe quantum dots having oleic acid ligands and red CdSe quantum dots having oleic acid ligands. Alternatively, or in addition, octadecylphosphonic acid ("ODPA") ligands may be used instead of oleic acid ligands. The ligands promote solubility of the quantum dots in the polymerizable composition which allows higher loadings without agglomeration which can lead to red shifting.

Ligands can be derived from a coordinating solvent that may be included in the reaction mixture during the growth process.

Ligands can be added to the reaction mixture.

Ligands can be derived from a reagent or precursor included in the reaction mixture for synthesizing the quantum dots.

In certain embodiments, quantum dots can include more than one type of ligand attached to an outer surface.

A quantum dot surface that includes ligands derived from the growth process or otherwise can be modified by repeated exposure to an excess of a competing ligand group (including, e.g., but not limited to, a coordinating group) to form an overlayer. For example, a dispersion of the capped quantum dots can be treated with a coordinating organic compound, such as pyridine, to produce crystallites which disperse readily in pyridine, methanol, and aromatics but no longer disperse in aliphatic solvents. Such a surface exchange process can be carried out with any compound capable of coordinating to or bonding with the outer surface of the nanoparticle, including, for example, but not limited to, phosphines, thiols, amines and phosphates.

For example, a quantum dot can be exposed to short chain polymers which exhibit an affinity for the surface and which terminate in a moiety having an affinity for a suspension or dispersion medium. Such affinity improves the stability of the suspension and discourages flocculation of the quantum dot. Examples of additional ligands include fatty acid ligands, long chain fatty acid ligands, alkyl phosphines, alkyl phosphine oxides, alkyl phosphonic acids, or alkyl phosphinic acids, pyridines, furans, and amines. More specific examples include, but are not limited to, pyridine, tri-n-octyl phosphine (TOP), tri-n-octyl phosphine oxide (TOPO), tris-hydroxylpropylphosphine (tHPP) and octadecylphosphonic acid ("ODPA"), Technical grade TOPO can be used.

Suitable coordinating ligands can be purchased commercially or prepared by ordinary synthetic organic techniques, for example, as described in J. March, Advanced Organic Chemistry, which is incorporated herein by reference in its entirety.

The emission from a quantum dot capable of emitting light can be a narrow Gaussian emission band that can be tuned through the complete wavelength range of the ultraviolet, visible, or infra-red regions of the spectrum by varying the size of the quantum dot, the composition of the quantum dot, or both. For example, a semiconductor nanocrystal comprising CdSe can be tuned in the visible region; a semiconductor nanocrystal comprising InAs can be tuned in the infra-red region. The narrow size distribution of a population of quantum dots capable of emitting light can result in emission of light in a narrow spectral range. The population can be monodisperse and preferably exhibits less than a 15% rms (root-mean-square) deviation in diameter of such quantum dots, more preferably less than 10%, most preferably less than 5%. Spectral emissions in a narrow range of no greater than about 75 nm, preferably no greater than about 60 nm, more preferably no greater than about 40 nm, and most preferably no greater than about 30 nm full width at half max (FWHM) for such quantum dots that emit in the visible can be observed. IR-emitting quantum dots can have a FWHM of no greater than 150 nm, or no greater than 100 nm. Expressed in terms of the energy of the emission, the emission can have a FWHM of no greater than 0.05 eV, or no greater than 0.03 eV. The breadth of the emission decreases as the dispersity of the light-emitting quantum dot diameters decreases.

Quantum dots can have emission quantum efficiencies such as greater than 10%, 20%, 30%, 40%, 50%, 60%, 70%, 80%, or 90%.

The narrow FWHM of quantum dots can result in saturated color emission. The broadly tunable, saturated color emission over the entire visible spectrum of a single material system is unmatched by any class of organic chromophores (see, for example, Dabbousi et al., J. Phys. Chem. 101, 9463 (1997), which is incorporated by reference in its entirety). A monodisperse population of quantum dots will emit light spanning a narrow range of wavelengths.

Useful quantum dots according to the present invention are those that emit wavelengths characteristic of red light. In certain preferred embodiments, quantum dots capable of emitting red light emit light having a peak center wavelength in a range from about 615 nm to about 635 nm, and any wavelength or range in between whether overlapping or not. For example, the quantum dots can be capable of emitting red light having a peak center wavelength of about 635 nm, about 630 nm, of about 625 nm, of about 620 nm, or of about 615 nm.

Useful quantum dots according to the present invention are also those that emit wavelengths characteristic of green light. In certain preferred embodiments, quantum dots capable of emitting green light emit light having a peak center wavelength in a range from about 520 nm to about 545 nm, and any wavelength or range in between whether overlapping or not. For example, the quantum dots can be capable of emitting green light having a peak center wavelength of about 520 nm, of about 525 nm, of about 535 nm, of about 540 nm or of about 540 nm.

According to further aspects of the present invention, the quantum dots exhibit a narrow emission profile in the range of between about 23 nm and about 60 nm at full width half maximum (FWHM). The narrow emission profile of quantum dots of the present invention allows the tuning of the quantum dots and mixtures of quantum dots to emit saturated colors thereby increasing color gamut and power efficiency beyond that of conventional LED lighting displays. According to one aspect, green quantum dots designed to emit a predominant wavelength of, for example, about 523 nm and having an emission profile with a FWHM of about, for example, 37 nm are combined, mixed or otherwise used in combination with red quantum dots designed to emit a predominant wavelength of about, for example, 617 nm and having an emission profile with a FWHM of about, for example 32 nm. Such combinations can be stimulated by blue light to create trichromatic white light.

Quantum dots in accordance with the present invention can be included in various formulations depending upon the desired utility. According to one aspect, quantum dots are included in flowable formulations or liquids to be included, for example, into clear vessels, such as the stress-resistant tubes of the present invention, which are to be exposed to light. Such formulations can include various amounts of one or more type of quantum dots and one or more host materials. Such formulations can further include one or more scatterers. Other optional additives or ingredients can also be included in a formulation. In certain embodiments, a formulation can further include one or more photo initiators. One of skill in the art will readily recognize from the present invention that additional ingredients can be included depending upon the particular intended application for the quantum dots.

An optical material or formulation within the scope of the invention may include a host material, such as can be included in an optical component described herein, which may be present in an amount from about 50 weight percent and about 99.5 weight percent, and any weight percent in between whether overlapping or not. In certain embodiments, a host material may be present in an amount from about 80 to about 99.5 weight percent. Examples of specific useful host materials include, but are not limited to, polymers, oligomers, monomers, resins, binders, glasses, metal oxides, and other nonpolymeric materials. Preferred host materials include: polymeric and non-polymeric materials that are at least partially transparent, and preferably fully transparent, to preselected wavelengths of light. In certain embodiments, the preselected wavelengths can include wavelengths of light in the visible (e.g., 400-700 nm) region of the electromagnetic spectrum. Preferred host materials include cross-linked polymers and solvent-cast polymers. Examples of other preferred host materials include, but are not limited to, glass or a transparent resin. In particular, a resin such as a non-curable resin, heat-curable resin, or photocurable resin is suitably used from the viewpoint of processability. Specific examples of such a resin, in the form of either an oligomer or a polymer, include, but are not limited to, a melamine resin, a phenol resin, an alkyl resin, an epoxy resin, a polyurethane resin, a maleic resin, a polyamide resin, polymethyl methacrylate, polyacrylate, polycarbonate, polyvinyl alcohol, polyvinylpyrrolidone, hydroxyethylcellulose, carboxymethylcellulose, copolymers containing monomers or oligomers forming these resins, and the like. Other suitable host materials can be identified by persons of ordinary skill in the relevant art.

Host materials can also comprise silicone materials. Suitable host materials comprising silicone materials can be identified by persons of ordinary skill in the relevant art.

In certain embodiments and aspects of the inventions contemplated by this invention, a host material comprises a photocurable resin. A photocurable resin may be a preferred host material in certain embodiments, e.g., in embodiments in which the composition is to be patterned. As a photocurable resin, a photo-polymerizable resin such as an acrylic acid or methacrylic acid based resin containing a reactive vinyl group, a photo-crosslinkable resin which generally contains a photo-sensitizer, such as polyvinyl cinnamate, benzophenone, or the like may be used. A heat-curable resin may be used when the photo-sensitizer is not used. These resins may be used individually or in combination of two or more.

In certain embodiments and aspects of the inventions contemplated by this invention, a host material can comprise a solvent-cast resin. A polymer such as a polyurethane resin, a maleic resin, a polyamide resin, polymethyl methacrylate, polyacrylate, polycarbonate, polyvinyl alcohol, polyvinylpyrrolidone, hydroxyethylcellulose, carboxymethylcellulose, copolymers containing monomers or oligomers forming these resins, and the like can be dissolved in solvents known to those skilled in the art. Upon evaporation of the solvent, the resin forms a solid host material for the semiconductor nanoparticles.

In certain embodiments, acrylate monomers and/or acrylate oligomers which are commercially available from Radcure and Sartomer can be preferred.

Quantum dots can be encapsulated. Nonlimiting examples of encapsulation materials, related methods, and other information that may be useful are described in International Application No. PCT/US2009/01372 of Linton, filed 4 Mar. 2009 entitled "Particles Including Nanoparticles, Uses Thereof, And Methods" and U.S. Patent Application No. 61/240,932 of Nick et al., filed 9 Sep. 2009 entitled "Particles Including Nanoparticles, Uses Thereof, And Methods", each of the foregoing being hereby incorporated herein by reference in its entirety.

The total amount of quantum dots included in an optical material, such as a host material for example a polymer matrix, within the scope of the invention is preferably in a range from about 0.05 weight percent to about 5 weight percent, and more preferably in a range from about 0.1 weight percent to about 5 weight percent and any value or range in between whether overlapping or not. The amount of quantum dots included in an optical material can vary within such range depending upon the application and the form in which the quantum dots are included (e.g., film, optics (e.g., encapsulated film, etc.), which can be chosen based on the particular end application. For instance, when an optic material is used in a thicker capillary with a longer pathlength (e.g., such as in BLUs for large screen television applications), the concentration of quantum dots can be closer to 0.5%. When an optical material is used in a thinner capillary with a shorter pathlength (e.g., such as in BLUs for mobile or hand-held applications), the concentration of quantum dots can be closer to 5%.

The ratio of quantum dots used in an optical material is determined by the emission peaks of the quantum dots used. For example, when quantum dots capable of emitting green light having a peak center wavelength in a range from about 514 nm to about 545 nm, and any wavelength in between whether overlapping or not, and quantum dots capable of emitting red light having a peak center wavelength in a range from about 615 nm to about 640 nm, and any wavelength in between whether overlapping or not, are used in an optical material, the ratio of the weight percent green-emitting quantum dots to the weight percent of red-emitting quantum dots can be in a range from about 12:1 to about 1:1, and any ratio in between whether overlapping or not.

The above ratio of weight percent green-emitting quantum dots to weight percent red-emitting quantum dots in an optical material can alternatively be presented as a molar ratio. For example, the above weight percent ratio of green to red quantum dots can correspond to a green to red quantum dot molar ratio in a range from about 24.75 to 1 to about 5.5 to 1, and any ratio in between whether overlapping or not.

The ratio of the blue to green to red light output intensity in white trichromatic light emitted by a quantum dot containing BLU described herein including blue-emitting solid state inorganic semiconductor light emitting devices (having blue light with a peak center wavelength in a range from about 450 nm to about 460 nm, and any wavelength in between whether overlapping or not), and an optical material including mixtures of green-emitting quantum dots and red-emitting quantum dots within the above range of weight percent ratios can vary within the range. For example, the ratio of blue to green light output intensity therefor can be in a range from about 0.75 to about 4 and the ratio of green to red light output intensity therefor can be in a range from about 0.75 to about 2.0. In certain embodiments, for example, the ratio of blue to green light output intensity can be in a range from about 1.0 to about 2.5 and the ratio of green to red light output intensity can be in a range from about 0.9 to about 1.3.

Scatterers, also referred to as scattering agents, within the scope of the invention may be present, for example, in an amount of between about 0.01 weight percent and about 1 weight percent. Amounts of scatterers outside such range may also be useful. Examples of light scatterers (also referred to herein as scatterers or light scattering particles) that can be used in the embodiments and aspects of the inventions described herein, include, without limitation, metal or metal oxide particles, air bubbles, and glass and polymeric beads (solid or hollow). Other light scatterers can be readily identified by those of ordinary skill in the art. In certain embodiments, scatterers have a spherical shape. Preferred examples of scattering particles include, but are not limited to, $TiO_2$, $SiO_2$, $BaTiO_3$, $BaSO_4$, and ZnO. Particles of other materials that are non-reactive with the host material and that can increase the absorption pathlength of the excitation light in the host material can be used. In certain embodiments, light scatterers may have a high index of refraction (e.g., $TiO_2$, $BaSO_4$, etc) or a low index of refraction (gas bubbles).

Selection of the size and size distribution of the scatterers is readily determinable by those of ordinary skill in the art. The size and size distribution can be based upon the refractive index mismatch of the scattering particle and the host material in which the light scatterers are to be dispersed, and the preselected wavelength(s) to be scattered according to light scattering theory, e.g., Rayleigh or Mie scattering theory. The surface of the scattering particle may further be treated to improve dispersability and stability in the host material. In one embodiment, the scattering particle comprises $TiO_2$ (R902+ from DuPont) of 0.2 μm particle size, in a concentration in a range from about 0.01 to about 1% by weight.

The amount of scatterers in a formulation is useful in applications where the formulation may be in form of an ink is contained in a clear vessel having edges to limit losses due the total internal reflection. The amount of the scatterers may be altered relative to the amount of quantum clots used in the formulation. For example, when the amount of the scatter is increased, the amount of quantum clots may be decreased.

Examples of thixotropes which may be included in a quantum dot formulation, also referred to as rheology modifiers, include, but are not limited to, fumed metal oxides (e.g., fumed silica which can be surface treated or untreated (such as Cab-O-Sil™ fumed silica products available from Cabot Corporation)) or fumed metal oxide gels (e.g., a silica gel). An optical material can include an amount of thixotrope in a range from about 5 to about 12 weight percent. Other amounts outside the range may also be determined to be useful or desirable.

In certain embodiments, a formulation including quantum dots and a host material can be formed from an ink comprising quantum dots and a liquid vehicle, wherein the liquid vehicle comprises a composition including one or more functional groups or units that are capable of being cross-linked. The functional units can be cross-linked, for example, by UV treatment, thermal treatment, or another cross-linking technique readily ascertainable by a person of ordinary skill in a relevant art. In certain embodiments, the composition including one or more functional groups that are capable of being cross-linked can be the liquid vehicle itself. In certain embodiments, it can be a co-solvent. In certain embodiments, it can be a component of a mixture with the liquid vehicle.

One particular example of a preferred method of making an ink is as follows. A solution including quantum dots having the desired emission characteristics well dispersed in an organic solvent is concentrated to the consistency of a wax by first stripping off the solvent under nitrogen/vacuum until a quantum dot containing residue with the desired consistency is obtained. The desired resin monomer is then added under nitrogen conditions, until the desired monomer to quantum dot ratio is achieved. This mixture is then vortex mixed under oxygen free conditions until the quantum dots are well dispersed. The final components of the resin are then added to the quantum dot dispersion, and are then sonicated mixed to ensure a fine dispersion.

A tube or capillary comprising an optical material prepared from such finished ink can be prepared by then introducing the ink into the tube via a wide variety of methods, and then UV cured under intense illumination for some number of seconds for a complete cure.

In certain aspects and embodiments of the inventions taught herein, the optic including the cured quantum dot containing ink is exposed to light flux for a period of time sufficient to increase the photoluminescent efficiency of the optical material.

In certain embodiments, the optical material is exposed to light and heat for a period of time sufficient to increase the photoluminescent efficiency of the optical material.

In preferred certain embodiments, the exposure to light or light and heat is continued for a period of time until the photoluminescent efficiency reaches a substantially constant value.

In one embodiment, for example, after the optic, i.e. tube or capillary, is filled with quantum dot containing ink, cured, and sealed (regardless of the order in which the curing and sealing steps are conducted), the optic is exposed, to 25-35 $mW/cm^2$ light flux with a wavelength in a range from about 365 nm to about 470 nm, while at a temperature in a range from about 25 to 80° C., for a period of time sufficient to increase the photoluminescent efficiency of the ink. In one embodiment, for example, the light has a wavelength of about 450 nm, the light flux is 30 $mW/cm^2$, the temperature 80° C., and the exposure time is 3 hours.

Additional information that may be useful in connection with the present disclosure and the inventions described herein is included in International Application No. PCT/US2009/002796 of Coe-Sullivan et al, filed 6 May 2009, entitled "Optical Components, Systems Including An Optical Component, And Devices"; International Application No. PCT/US2009/002789 of Coe-Sullivan et al, filed 6 May 2009, entitled "Solid State Lighting Devices Including Quantum Confined Semiconductor Nanoparticles, An Optical Component For A Solid State Light Device, And Methods"; International Application No. PCT/US2010/32859 of Modi et al, filed 28 Apr. 2010 entitled "Optical Materials, Optical Components, And Methods"; International Application No. PCT/US2010/032799 of Modi et al, filed 28 Apr. 2010 entitled "Optical Materials, Optical Components, Devices, And Methods"; International Application No. PCT/US2011/047284 of Sadasivan et al, filed 10 Aug. 2011 entitled "Quantum Dot Based Lighting"; International Application No. PCT/US2008/007901 of Linton et al, filed 25 Jun. 2008 entitled "Compositions And Methods Including Depositing Nanomaterial"; U.S. patent application Ser. No. 12/283,609 of Coe-Sullivan et al, filed 12 Sep. 2008 entitled "Compositions, Optical Component, System Including An Optical Component, Devices, And Other Products"; international Application No. PCT/US2008/10651 of Breen et al, filed 12 Sep. 2008 entitled "Functionalized Nanoparticles And Method"; U.S. Pat. No. 6,600,175 of Baretz, et al., issued Jul. 29, 2003, entitled "Solid State White Light Emitter And Display Using Same"; and U.S. Pat. No. 6,608,332 of Shimizu, et al., issued Aug. 19, 2003, entitled "Light Emitting Device and Display"; each of the foregoing being hereby incorporated herein by reference in its entirety.

LEDs within the scope of the present invention include any conventional LED such as those commercially available from Citizen, Nichia, Osram, Cree, or Lumileds. Useful light emitted from LEDs includes white light, off white light, blue light, green light and any other light emitted from an LED.

Example I

Preparation of Semiconductor Nanocrystals Capable of Emitting Red Light

Synthesis of CdSe Seed Cores:

262.5 mmol of cadmium acetate was dissolved in 3.826 mol of tri-n-octylphosphine at 100° C. in a 3 L 3-neck round-bottom flask and then dried and degassed for one hour. 4.655 mol of trioctylphosphine oxide and 599.16 mmol of octadecylphosphonic acid were added to a 5 L stainless steel reactor and dried and degassed at 140° C. for one hour. After degassing, the Cd solution was added to the reactor containing the oxide/acid and the mixture was heated to 310° C. under nitrogen. Once the temperature reached 310° C., the heating mantle is removed from the reactor and 731 mL of 1.5 M diisobutylphosphine selenide (DIBP-Se) (900.2 mmol Se) in 1-Dodecyl-2-pyrrolidinone (NDP) was then rapidly injected. The reactor is then immediately submerged in partially frozen (via liquid nitrogen) squalane bath rapidly reducing the temperature of the reaction to below 100° C. The first absorption peak of the nanocrystals was 480 nm. The CdSe cores were precipitated out of the growth solution inside a nitrogen atmosphere glovebox by adding a 3:1 mixture of methanol and isopropanol. After removal of the methanol/isopropanol mixture, the isolated cores were then dissolved in hexane and used to make core-shell materials. The isolated material specifications were as follows: Optical Density@350 nm=2.83; Abs=481 nm; Emission=510 nm; FWHM=40 nm; Total Volume=1.9 L of hexane.

Growth of CdSe Cores:

A 1 L glass reactor was charged with 320 mL of 1-octadecene (ODE) and degassed at 120° C. for 15 minutes under vacuum. The reactor was then backfilled with $N_2$ and the temperature set to 60° C. 120 mL of the CdSe seed core above was injected into the reactor and the hexanes were removed under reduced pressure until the vacuum gauge reading was <500 mTorr. The temperature of the reaction mixture was then set to 240° C. Meanwhile, two 50 mL syringes were loaded with 80 mL of cadmium oleate in TOP (0.5 M conc.) solution and another two syringes were loaded with 80 mL of di-iso-butylphosphine selenide (DiBP-Se) in TOP (0.5 M conc.). Once the reaction mixture reached 240° C., the Cd oleate and DiBP-Se solutions were infused into the reactor at a rate of 35 mL/hr. The $1^{st}$ excitonic absorption feature of the CdSe cores was monitored during infusion and the reaction was stopped at ~60 minutes when the absorption feature was 569 nm. The resulting CdSe cores were then ready for use as is in this growth solution for overcoating.

Synthesis of CdSe/ZnS/CdZnS Core-Shell Nanocrystals:

115 mL of the CdSe core above with a first absorbance peak at 569 nm was mixed in a 1 L reaction vessel with 1-octadecene (45 mL), and Zn(Oleate) (0.5 M in TOP, 26 mL). The reaction vessel was heated to 120° C. and vacuum was applied for 15 min. The reaction vessel was then back-filled with nitrogen and heated to 310° C. The temperature was ramped, between 1° C./5 seconds and 1° C./15 seconds. Once the vessel reached 300° C., octanethiol (11.4 mL) was swiftly injected and a timer started. Once the timer reached 6 min., one syringe containing zinc oleate (0.5 M in TOP, 50 mL) and cadmium oleate (1 M in TOP, 41 mL), and another syringe containing octanethiol (42.2 mL) were swiftly injected. Once the timer reached 40 min., the heating mantle was dropped and the reaction cooled by subjecting the vessel to a cool air flow. The final material was precipitated via the addition of butanol and methanol (4:1 ratio), centrifuged at 3000 RCF for 5 min, and the pellet redispersed into hexanes. The sample is then precipitated once more via the addition of butanol and methanol (3:1 ratio), centrifuged, and dispersed into toluene for storage (616 nm emission, 25 nm FWHM, 80% QY, and 94% EQE in film).

Example II

Preparation of Semiconductor Nanocrystals Capable of Emitting Green Light

Synthesis of CdSe Cores:

262.5 mmol of cadmium acetate was dissolved in 3.826 mol of tri-n-octylphosphine at 100° C. in a 3 L 3-neck round-bottom flask and then dried and degassed for one hour. 4.655 mol of trioctylphosphine oxide and 599.16 mmol of octadecylphosphonic acid were added to a 5 L stainless steel reactor and dried and degassed at 140° C. for one hour. After degassing, the Cd solution was added to the reactor containing the oxide/acid and the mixture was heated to 310° C. under nitrogen. Once the temperature reached 310° C., the heating mantle was removed from the reactor and 731 mL of 1.5 M diisobutylphosphine selenide (DIBP-Se) (900.2 mmol Se) in 1-Dodecyl-2-pyrrolidinone (NDP) was then rapidly injected. The reactor was then immediately submerged in a partially frozen (via liquid nitrogen) squalane bath rapidly reducing the temperature of the reaction to below 100° C. The first absorption peak of the nanocrystals was 487 nm. The CdSe cores were precipitated out of the growth solution inside a nitrogen atmosphere glovebox by adding a 3:1 mixture of methanol and isopropanol. The isolated cores were then dissolved in hexane and used to make core-shell materials. The isolated material specifications were as follows: Optical Density@350 nm=1.62; Abs=486 nm; Emission=509 nm; FWHM=38 nm; Total Volume=1.82 L of hexane.

Synthesis of CdSe/ZnS/CdZnS Core-Shell Nanocrystals:

335 mL of 1-octadecene (ODE), 12.55 g of zinc acetate, and 38 mL of oleic acid were loaded into a 1 L glass reactor and degassed at 100° C. for 1 hour. In a 1 L 3-neck flask, 100 mL of ODE was degassed at 120° C. for 1 hour. After degassing, the temperature of the flask was reduced to 65° C. and then 23.08 mmol of CdSe cores from the procedure above (275 mL) were blended into the 100 mL of degassed ODE and the hexane was removed under reduced pressure. The temperature of the reactor was then raised to 310° C. In a glove box, the core/ODE solution and 40 mL of octanethiol were added to a 180 mL container. In a 600 container, 151 mL of 0.5 M Zn Oleate in TOP, 37 mL of 1.0 M Cd Oleate in TOP, and 97 mL of 2 M TOP-S were added. Once the temperature of the reactor hit 310° C., the ODE/OD cores/Octanethiol mixture was injected into the reactor and allowed to react for 30 min at 300° C. After this reaction period, the Zn Oleate/Cd Oleate/TOP-S mixture was injected to the reactor and the reaction was allowed to continue for an additional 30 minutes at which point the mixture was cooled to room temperature. The resulting core-shell material was precipitated out of the growth solution inside a nitrogen atmosphere glovebox by adding a 2:1 mixture of butanol and methanol. The isolated quantum dots (QDs) were then dissolved in toluene and precipitated a second time using 2:3 butanol:methanol. The QDs were finally dispersed in toluene. The isolated material specifications were as follows: Optical Density@450 nm (100 Fold Dilution)=0.32; Abs=501 nm; Emission=518 nm; FWHM=38 nm; Solution QY=60%; Film EQE=93%.

Example III

Preparation of Polymerizable Formulation Including Quantum Dots

A polymerizable formulation including quantum dots was prepared as follows:

A clean, dry Schlenk flask equipped with a magnetic stir bar and rubber septum was charged with 57.75 mL lauryl methacrylate (LMA) (Aldrich Chemical, 96%), 9.93 mL ethylene glycol diacrylate (EGDMA) as well as any additive(s) indicated for the particular example The solution was inserted using a vacuum manifold and degassed in a standard protocol by freeze-pump-thawing the mixture three times successively using liquid nitrogen. The thawed solution is finally placed under nitrogen and labeled "monomer solution".

Separately, a clean, dry Schlenk flask equipped with a magnetic stir bar and rubber septum was charged with 6.884 g treated fumed silica (TS-720, Cabot Corp), 103.1 mg titanium dioxide (R902+, DuPont Corp.) and inerted under nitrogen. To this is added 69 mL toluene (dry and oxygen free). The mixture is placed in an ultrasonic bath for 10 minutes and then stirred under nitrogen. This is labeled "metal oxide slurry".

Separately, a clean, dry Schlenk flask equipped with a magnetic stir bar and rubber septum was incited under nitrogen. The flask was then charged with a green quantum dot solution (13.1 mL of quantum dots prepared as generally described in Example II above) in toluene, red quantum dot solution (2.55 mL of quantum dots prepared as generally described in Example I above) in toluene and 69 mL additional toluene via syringe and allowed to stir for 5 minutes. Over 6 minutes, the contents of the "monomer solution flask" were added via syringe and stirred for an additional five minutes. The contents of the "metal oxide slurry" flask were next added over 5 minutes via cannula and rinsed over with the aid of a minimum amount of additional toluene.

The stirred flask was then placed in a warm water bath (<60° C.), covered with aluminum foil to protect from light and placed under a vacuum to remove all of the toluene to a system pressure of <200 mTorr. After solvent removal was completed, slurry was removed from heat and, with stirring, 640 µL Irgacure 2022 photoinitiator (BASF), without purification, was added via syringe and allowed to stir for 5 minutes. The final ink was then ready for transfer to a fill station.

Example IV

Filling Capillary, Forming Quantum Dot Matrix, and Capillary Sealing

A stress-resistant tube was filled under oxygen free conditions with the quantum dot formulation of Example III as follows: Glass capillaries are maintained in a vacuum drying oven under nitrogen for 12 hours at a pressure of less than 1 torr and a temperature of 120° C. A quantum dot ink formulation of Example III is maintained in a quantum dot ink vessel under nitrogen. Capillaries with both ends open are removed from the vacuum drying oven and placed into a vacuum fill vessel with an open end down into quantum dot ink. The quantum dot ink vessel is connected to the vacuum fill vessel via tubing and valves such that ink is able to flow from the quantum dot ink vessel to the vacuum fill vessel by applying pressure differentials. The pressure within the vacuum fill vessel is reduced to less than 200 torr and then repressurized with nitrogen. Quantum dot ink is admitted into the vacuum fill vessel by pressurization of the quantum dot ink vessel and the capillaries were allowed to fill under oxygen free conditions. Alternatively, the vacuum fill vessel can be evacuated thereby drawing the fluid up into the capillaries. After the capillaries are filled, the system is bled to atmospheric pressure. The exterior of the capillaries is then cleaned using toluene.

According to an additional embodiment with reference to FIG. 2, a capillary with one end sealed is connected to a filling head. The capillary is evacuated by vacuum. Quantum dot ink under nitrogen pressure is then filled into the capillary. The lines and filling head is flushed with nitrogen. The capillary is then removed from the filling head under an atmosphere of nitrogen or nitrogen is backfilled into the capillary and the end sealed, such as by melting the capillary end and sealing.

The polymerizable formulation within the glass tube is polymerized as follows. The tubes are transferred to a photopolymerization reactor where the tubes are placed on a continuously moving belt and exposed for 30 seconds to light from a mercury "H" or "D" lamp at a fluence of 250-1000 J/cm. After polymerization, the tubes are end sealed, preferably under a nitrogen atmosphere, using an epoxy. Alternatively, with reference to FIG. 2, the quantum dot ink in the sealed capillary is then cured within the capillary through exposure to ultra violet light of 395 nm wavelength or equivalent wavelength.

The completed, sealed capillary(ies) were exposed to 30 mW/cm$^2$light flux with a wavelength of about 450 nm, for 12 hours at 60° C. prior to any analytical testing.

Example V

Crack Resistance of Tube of Invention Compared to Prior Art Tube

Figure 3:
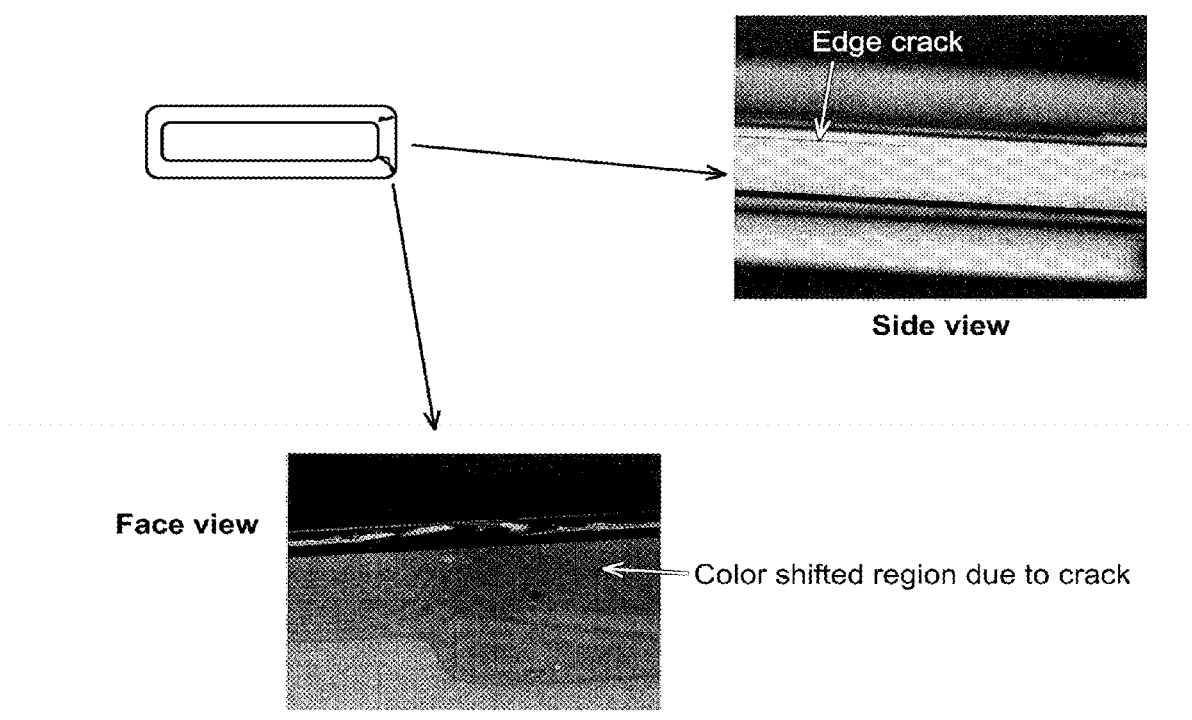
FIG. 3 depicts a photomicrograph of an example of a type of crack typical of a prior art capillary.

The improved stress resistance of the tubes of the present invention was determined by comparing the frequency of cracking of the stress-resistant tube to prior art tubes having a square configuration using the same polymerizable formulation and the same polymerization and curing conditions. The results show little to no cracking of the stress-resistant tubes with significant cracking of the prior art tubes. Prior art tubes that have a rectangular type cross section show a high frequency of cracking along the edge, especially after the quantum dot ink has been cured within. FIG. 3 shows a photomicrograph of the type of crack that can be eliminated with use of the tube design of the present invention. The prior art capillary was filled with quantum dot ink and cured as described in Example IV. Edge cracks developed immediately along the edges of the tube as shown in the figure.

Example VI

Light Emission Characteristics

The polymerized formulation within the stress-resistant tube was subjected to blue light from an LED.

A failure of the integrity of the capillary can adversely affect the stability of quantum dot ink. The integrity of the capillary with a quantum dot ink is tested on a setup. The setup consists of an array of blue LED with peak wavelength of 445 nm. A test capillary is subjected to a blue light flux of ~400 mW blue optical power/LED. The test capillary is held at a distance of about 0.6 mm above the LED array.

The emission spectra of the test capillary with red and green quantum dots were captured prior to the start of the blue light exposure. This is done by exciting the red and green quantum dots with a 445 nm blue light source and measuring the resultant spectra in an half moon integrating sphere. The test (capillary without cracks) and control (capillary with cracks) were tested prior to aging. The sample was then aged in the above mentioned setup for 87 hrs. The quantum dots in the cracked capillary (control) started to show degradation while the quantum dots in the capillary without cracks (test) showed no signs of degradation.

Figure 4:
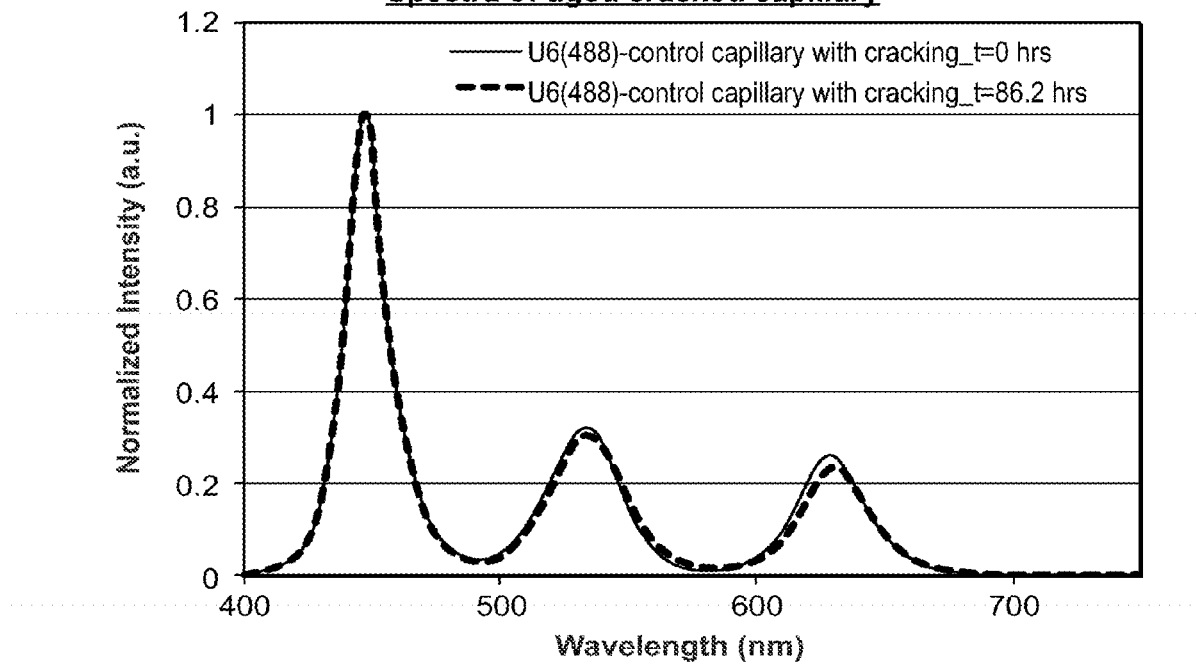
FIG. 4 shows the normalized spectra of quantum dot (QD) ink in a capillary with cracks measured at time t=0 and t=87 hours.
Figure 5:
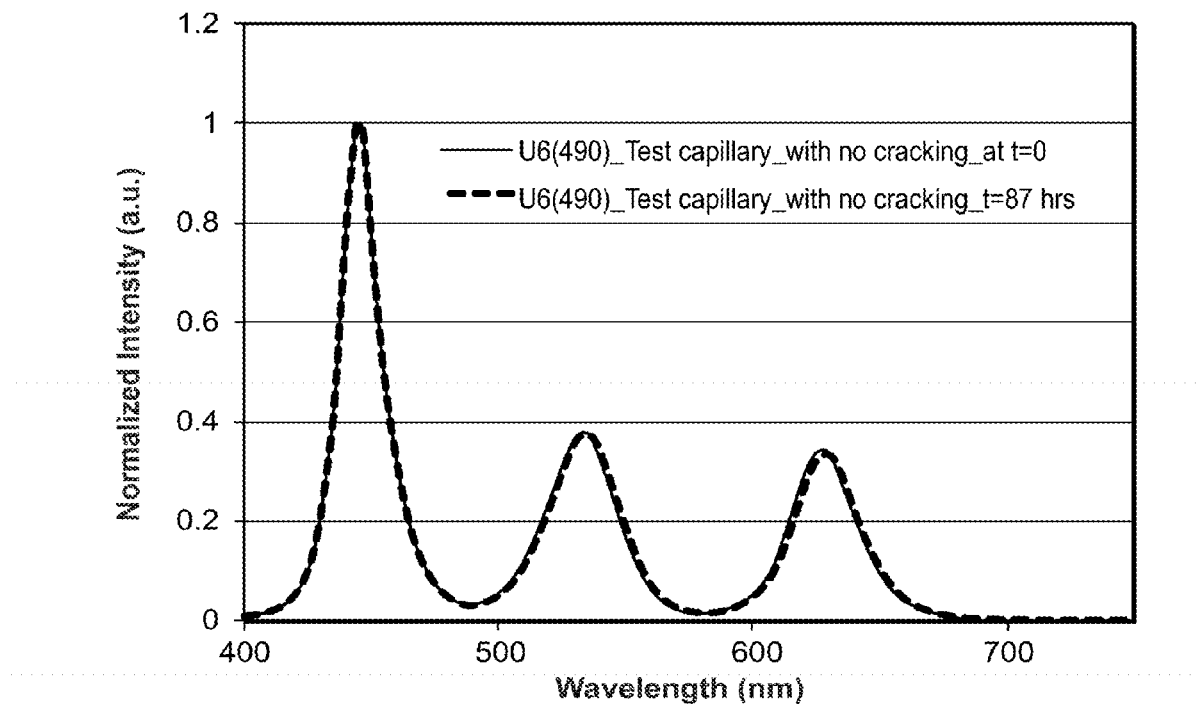
FIG. 5 shows the normalized spectra of QD ink in an example of an embodiment of a capillary in accordance with the invention, without cracks, measured at time t=0 and t=87 hours.

FIG. 4 shows the normalized spectra of the quantum dot ink in the control (capillary with cracks) capillary measured at time t=0 and t=87 hrs. The red and green peaks located at 627 nm and 533 nm respectively show loss in intensity. This loss in intensity is due to the degradation of red and green quantum dots in the cracked capillary FIG. 5 shows the normalized spectra of the quantum dot ink in the test (capillary without cracks) capillary measured at time t=0 and t=87 hrs. The red and green peaks located at 627 nm and 533 nm respectively show no change in intensity. Quantum dots in the capillary without cracks show no degradation.

"Solid state external quantum efficiency" (also referred to herein as "EQE" or "solid state photoluminescent efficiency) can be measured in a 12" integrating sphere using a NIST traceable calibrated light source, using the method developed by Mello et al., *Advanced Materials* 9(3):230 (1997), which is hereby incorporated by reference. Such measurements can also be made with a QEMS from LabSphere (which utilizes a 4 in sphere; e.g. QEMS-2000: World Wide Website laser2000.nl/upload/documenten/fop_21-en2.pdf).

As used herein, the singular forms "a", "an" and "the" include plural unless the context clearly dictates otherwise. Thus, for example, reference to an emissive material includes reference to one or more of such materials.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for making an optical component comprising preparing a glass tube defined by a light transmissive wall including a first full semicircle end and an opposite second full semicircle end and a pair of substantially parallel walls connecting the first full semicircle end and the second full semicircle end defining a uniform path length, wherein the full semicircle ends have an average thickness along a length of the tube which is smaller than an average thickness of the straight substantially parallel walls along the length of the tube;
introducing a polymerizable formulation including quantum dots into the glass tube, and
polymerizing the polymerizable formulation to form a matrix including quantum dots.

2. The method of claim 1, wherein the polymerizing step comprises subjecting the polymerizable formulation to Ultra Violet light.

3. The method of claim 2, wherein the polymerizable formulation resists yellowing, browning, or discoloration when subjected to light.

4. The method of claim 1 further comprising a step of sealing at least one open end of the glass tube.

5. The method of claim 4, wherein the glass tube is hermetically sealed.

6. The method of claim 4, wherein the glass tube is pseudo-hermetically sealed.

7. The method of claim 4, wherein the sealing step comprises sealing the at least one open end using glass or epoxy.

8. The method of claim 4, wherein the sealing step comprises
contacting the at least one open end with an epoxy; and
drawing the epoxy into the at least one open end due to shrinkage action of a curing resin.

9. The method of claim 4, wherein the sealing step comprises
covering the at least one open end with a glass adhering material; and
melting the at least one open end by heating the glass above the melting point of the glass and pinching the walls together to close the at least one open end to form a molten glass hermetic seal.

10. The method of claim 1 further comprising a step of exposing the glass tube including the quantum dots to light flux for a period of time sufficient to increase a photoluminescent efficiency of the optical component.

11. The method of claim 1 further comprising a step of exposing the glass tube including the quantum dots to light and heat for a period of time until a photoluminescent efficiency of the optical component reaches a substantially constant value.

* * * * *